(12) United States Patent
Cline et al.

(10) Patent No.: US 7,859,813 B2
(45) Date of Patent: Dec. 28, 2010

(54) SHUTOFF SYSTEM FOR POOL OR SPA

(75) Inventors: David J. Cline, Newport Beach, CA (US); Richard A. Corrington, Tustin, CA (US); Stefan Daystrom, Los Angeles, CA (US)

(73) Assignee: Balboa Instruments, Inc., Tustin, CA (US)

(*) Notice: Subject to any disclaimer, the term of this patent is extended or adjusted under 35 U.S.C. 154(b) by 0 days.

(21) Appl. No.: 12/627,775

(22) Filed: Nov. 30, 2009

(65) Prior Publication Data

US 2010/0132106 A1 Jun. 3, 2010

Related U.S. Application Data

(60) Division of application No. 11/112,524, filed on Apr. 22, 2005, now Pat. No. 7,417,834, and a continuation of application No. 12/184,177, filed on Jul. 31, 2008, now Pat. No. 7,626,789.

(51) Int. Cl.
*H02H 5/00* (2006.01)
*H02H 3/00* (2006.01)

(52) U.S. Cl. .......... 361/103; 361/42
(58) Field of Classification Search .......... 361/42, 361/103
See application file for complete search history.

(56) References Cited

U.S. PATENT DOCUMENTS

| 4,763,365 | A  | * | 8/1988  | Gerondale et al. | 4/493   |
|-----------|----|---|---------|------------------|---------|
| 6,643,108 | B2 | * | 11/2003 | Cline et al.     | 361/42  |
| 6,744,254 | B2 | * | 6/2004  | Clarey et al.    | 324/424 |
| 7,417,834 | B2 | * | 8/2008  | Cline et al.     | 361/42  |
| 7,626,789 | B2 | * | 12/2009 | Cline et al.     | 361/42  |

* cited by examiner

*Primary Examiner*—Stephen W Jackson
(74) *Attorney, Agent, or Firm*—Larry K. Roberts

(57) ABSTRACT

A control system for a bathing installation which has one or more electrically powered devices. A line voltage service is connected through a GFCI to power the electrically powered devices, the GFCI adapted to interrupt the service upon detection of a ground fault. A trip circuit may induce a ground fault and trip the GFCI in response to a trip signal, thereby disabling application of electrical power to the electrically powered devices. An electronic circuit is responsive to a fault condition for generating the trip signal.

20 Claims, 17 Drawing Sheets

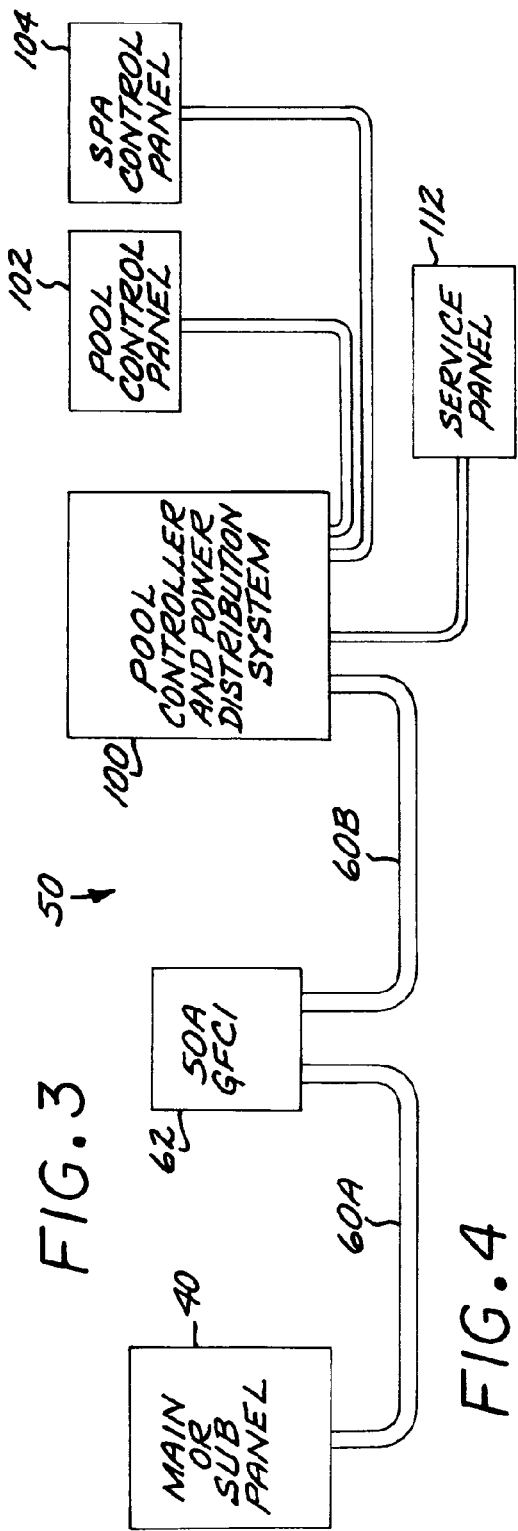
FIG. 3
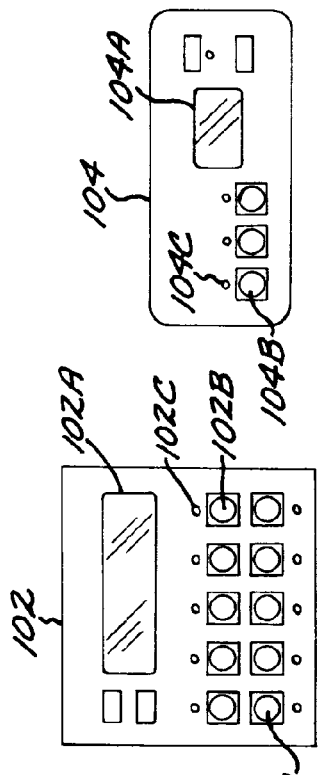
FIG. 6
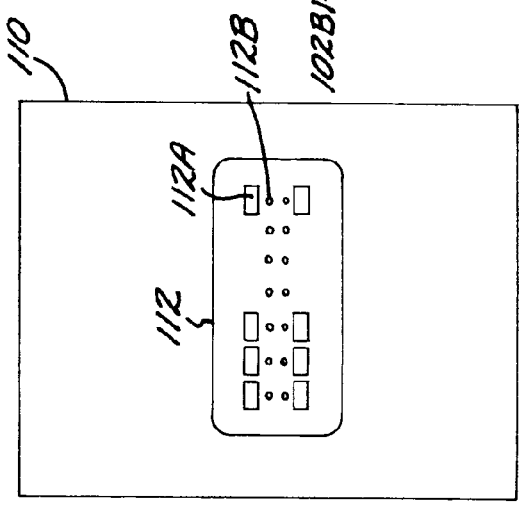
FIG. 5
FIG. 4

SHUTOFF SYSTEM FOR POOL OR SPA

CROSS-REFERENCE TO RELATED APPLICATIONS

This is a division of application Ser. No. 11/112,524, filed Apr. 22, 2005 now U.S. Pat. No. 7,417,834, and a continuation of application Ser. No. 12/184,177 filed Jul. 31, 2008 now U.S. Pat. No. 7,626,789, the entire contents of which applications are incorporated herein by this reference.

BACKGROUND

Electronic control systems have been employed to control various functions of bathing installations such as pools or spas. For example, the control system can control the pump which recirculates water in a spa. There can be malfunctions in which the pump continues to run, even though the controller has commanded it to the off condition, e.g. when the pump relay contacts providing power to the pump have fused together. When this occurs, the water temperature can slowly rise as the pump runs, potentially creating a scalding threat to a user.

A concern for a spa or pool is that the suction generated by the water flow may hold a person against a water outlet.

BRIEF DESCRIPTION OF THE DRAWINGS

Features and advantages of the disclosure will readily be appreciated by persons skilled in the art from the following detailed description when read in conjunction with the drawing wherein:

FIG. 3 is a simplified block diagram of elements of an exemplary embodiment of a pool service system.

FIG. 4 illustrates an exemplary embodiment of a control panel cabinet for housing the pool controller and power distribution system of the pool service system, and the service control panel mounted on the cabinet.

FIG. 5 is a diagrammatic view of the pool control panel comprising the system of FIG. 2.

FIG. 6 is a diagrammatic view of the spa control panel comprising the system of FIG. 2.

DETAILED DESCRIPTION

Figure 1:
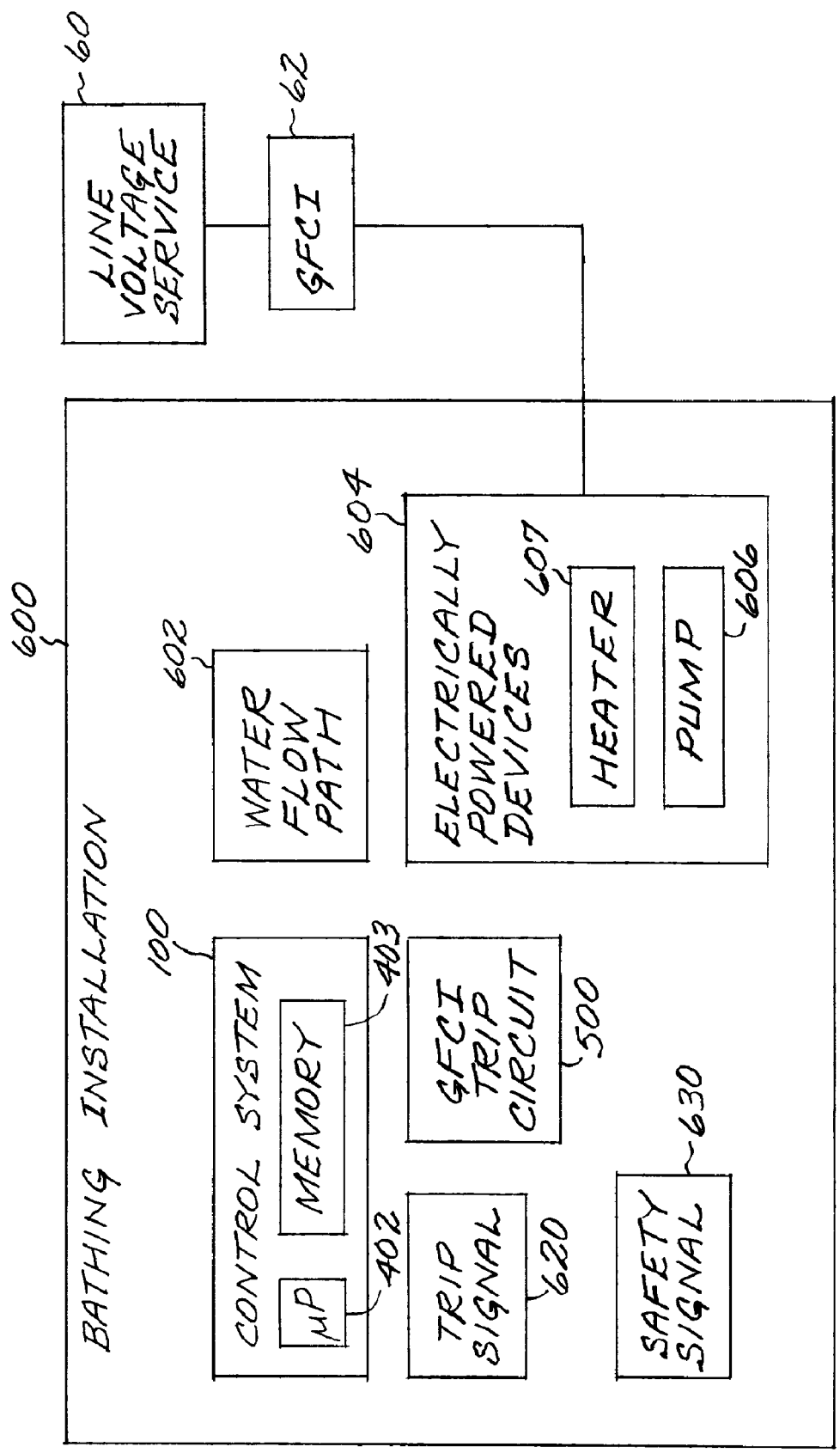
FIG. 1 is a simplified schematic diagram of a bathing installation.

In the following detailed description and in the several figures of the drawing, like elements are identified with like reference numerals.

A GFCI (ground fault circuit interrupter) is typically used for a bathing installation. An exemplary embodiment of a bathing installation electronic controller may be adapted to automatically test for the presence of a properly functioning GFCI before it will start up the bathing installation system. In one exemplary embodiment, the first time that the system is powered up after installation at a customer's site, the controller software activates a GFCI trip circuit. If the system does not immediately shut down from tripping the GFCI, the controller displays an error message and will not allow the bathing installation to operate. If the system shuts down as expected, the controller will operate normally after the GFCI is reset, and the system is re-started. In another exemplary embodiment, a manual test of the GFCI may be employed when the system is installed at a user's site, with a subsequent automatic test conducted after a certain time has elapsed from the initial power-up, which is selected to be a longer period than the system manufacturer typically tests a system prior to shipping to a distributor or customer.

In an exemplary embodiment, a GFCI trip circuit is provided for a bathing installation. The trip circuit is adapted to connect one side of the AC input power to ground through a resistor for a short period of time, setting up a current flow long enough to trip the GFCI. The period of time may depend on the particular GFCI implementation. As a precaution in case the GFCI does not trip, a flag or state may be set and stored in an nonvolatile memory just before this occurs. If the GFCI does not trip for any reason, the controller may detect the flag or state, turn off all devices, and enter a loop that does nothing but display a warning message on the screen. In an exemplary embodiment, a service technician may be required to repair and re-set the system to allow operation to resume.

An exemplary bathing installation 600 is depicted in the simplified schematic diagram of FIG. 1. The bathing installation includes a water flow path 602, which may be a recirculating water flow path in the case of a whirlpool bath, a spa or a pool installation. The installation includes at least one electrically powered device, e.g. a pump 606 or a water heater 607; other examples of electrically powered devices which may be employed with the installation include lights, valve actuators, voltage transformers and the like. An electronic control system 100 is provided which controls operation of the bathing installation including its electrically powered devices. The control system 100 may include a microprocessor 402 and a nonvolatile memory 403. Line voltage service 60 supplies electrical power to the bathing installation through a GFCI 62. The GFCI may be a stand-alone circuit external to controller 100 in one exemplary embodiment, and may also be integrated as part of a controller in another exemplary embodiment. A GFCI trip circuit 500 is provided as a means for inducing a ground fault to trip the GFCI in response to detected safety or fault conditions. For example, the GFCI trip circuit may be actuated in response to a trip signal 620 or a safety signal 630, either one of which may be generated by the control system 100 or by another circuit device. In one exemplary embodiment, the trip circuit is actuated as a final protective measure, after intermediate measures have been taken to address a given condition, or after monitoring a condition to ensure that the GFCI 62 is not unnecessarily tripped. For example, the safety signal may be indicative of a blockage in the water flow path, and other measures, e.g. issuing a command to turn off the pump and/or a valve to admit air into the water flow path to break a vacuum, or waiting a period of time and re-checking the safety signal, have been taken and have failed to address the condition. The fault condition may be indicated by a relatively high temperature of the water or by a rate of temperature rise in the water flow path. The controller may first attempt to address the condition by turning off the heater and the pump, and subsequently monitoring the water temperature for some period of time. If the temperature condition is not alleviated, and if the temperature rises, which may indicate a stuck pump relay or other malfunction, the controller may be programmed to activate the GFCI trip circuit to trip the GFCI. These are only examples of safety or fault conditions which may be addressed by the bathing installation depicted in FIG. 1.

Figure 1A:
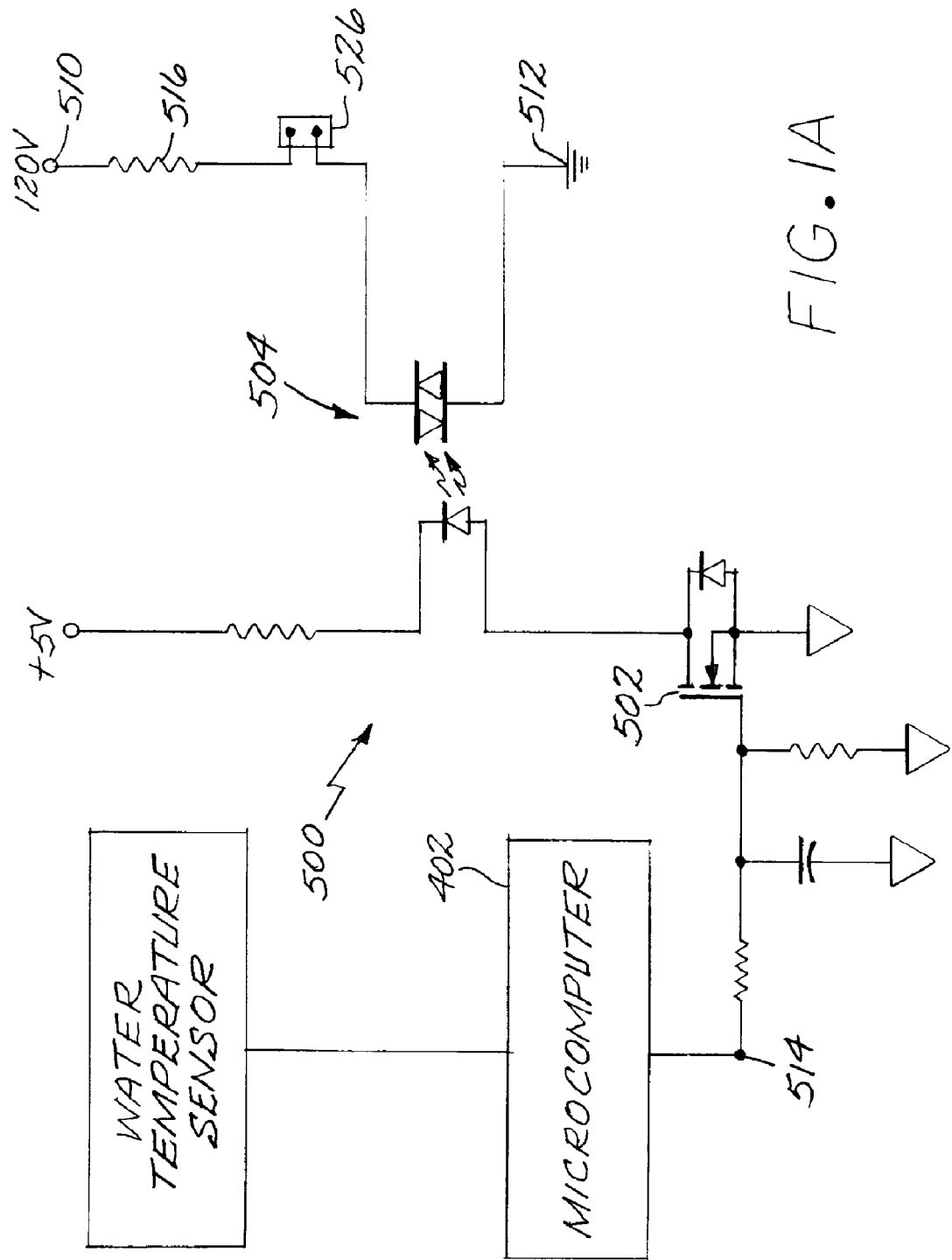
FIG. 1A is a simplified circuit schematic of an embodiment of a GFCI trip circuit.

FIG. 1A illustrates an exemplary embodiment of a GFCI trip circuit 500 suitable for use in a bathing installation. For example, an exemplary bathing installation may include an electronic control system comprising a microcomputer, illustrated as microcomputer 402 in FIG. 1A. The circuit 500 includes a terminal 514 which is coupled to the electronic control system, e.g. to the microcomputer 402, to receive a command signal on terminal 514 tripping the GFCI. The purpose of the circuit 500 is to selectively create a current flow, e.g. 9 ma in this example, between the 120AC black lead 510 and chassis ground 512. This current flow results in a current imbalance, which is detected by and trips the GFCI, shutting down the bathing system. This exemplary embodiment of the GFCI trip circuit comprises a transistor switch 502, whose gate is controlled by the voltage on terminal 514. The transistor 502 may be implemented, for example, by a 2N7002/SOT transistor. When the transistor 502 is conducting in the on state, a triac device 504 is turned on. An exemplary commercially available opto-isolated triac device suitable for the purpose is the MOC3021M device marketed by Fairchild. The triac 504 is connected in series with a resistor 516, between the 120 black lead 510 and the chassis ground 512, and thus when the triac device is conducting, a current flows to ground. The resistor value in an exemplary embodiment is 15 Kohm. When the voltage on command terminal 514 is low, the transistor 502 is biased to the off state, turning off the triac 504.

Figure 1B:
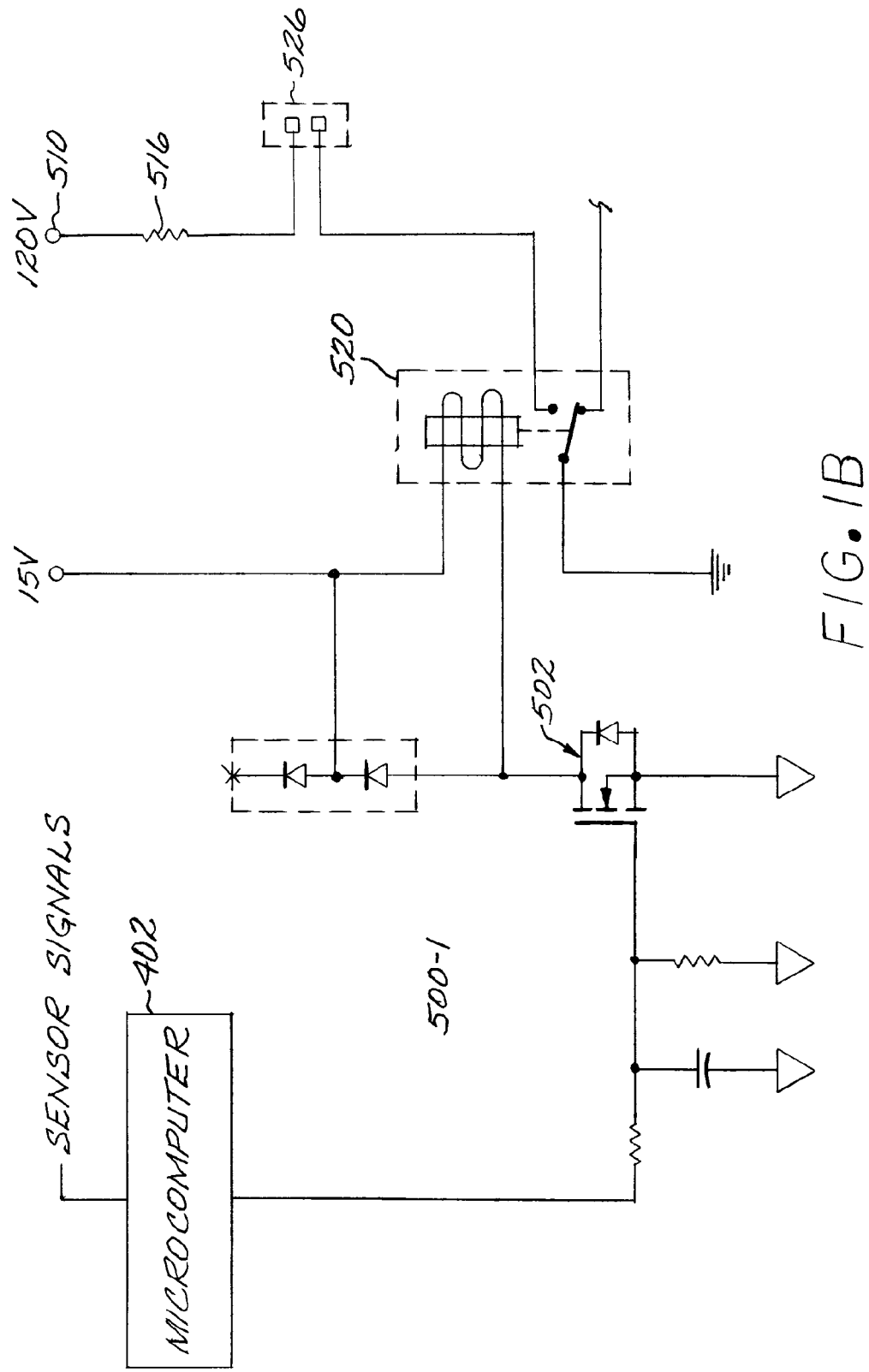
FIG. 1B is a simplified circuit schematic of an alternate embodiment of a GFCI trip circuit.

FIG. 1B illustrates another embodiment of a GFCI trip circuit 500-1. This embodiment is similar to the embodiment of FIG. 1A, but employs a relay circuit 520 instead of a triac. A pair of jumper terminals 526 are provided for enabling operation of the trip circuit. There may be applications for which the GFCI trip circuit is not to be operable, and the trip enable jumper terminals allow disabling this function.

There may be conditions in which it is desirable to provide a means to shut down power to the bathing installation, e.g. a spa system, in the event of a failure mode that typical protective circuits or spa controller algorithms may not adequately address. An example is a pump failure that causes an excessive amount of current to be drawn on startup. Such a failure may damage the contacts of the relay that provides power to the pump, welding the contacts together. If this happens, even though the relay is commanded by the controller to open to shut off the pump, the pump will continue to run. When the pump runs continuously, kinetic heating from the pump may be transferred into the spa water, causing the water temperature to slowly increase. Eventually the water can get so hot as to damage the spa, or become a scalding concern if a user does not check the water temperature before entry.

In an exemplary embodiment, the GFCI trip circuit provides a means for the controller to shut down the system in event of an occurrence such as a stuck or inoperative relay.

In an exemplary embodiment, the electronic controller and spa system may have multiple high-limit mechanisms designed to shut down the system in the event of an over-temperature condition. For example, at a given elevated temperature, say 110° F., the controller may be programmed to shut down all devices in the system by opening all relay coils and shutting off all triacs which control devices such as pumps and heaters. If the temperature continues to rise, at another temperature point, say 116° F., an independent hardware high-limit circuit may shut down the heater by opening heater high-limit relays in the system. If the temperature still continues to rise, say to 118° F., the controller may again (redundantly) de-energize all relay coils and shut off all triacs. As an additional protective measure in this exemplary embodiment, the GFCI trip circuit provides an additional shutdown mechanism in the event the water temperature still continues to rise, as in the exemplary case of a stuck pump relay. If the controller detects that the water temperature has reached some predetermined elevated temperature, say 120° F., under a predetermined additional condition or set of conditions, the controller enables the GFCI trip circuit. The condition or set of conditions is designed in an exemplary embodiment to reduce or eliminate tripping the GFCI under false positive indications based purely on a temperature reading. This trips the GFCI and shuts down all power to the system, preventing the water temperature from continuing to rise. If the spa user attempts to reset the GFCI, the controller may display a critical error message for a short period of time, and then once again trip the GFCI. The error message may alert the spa user to contact a service technician so that appropriate repairs can be made.

A concern for a bathing installation such as a spa is that the suction generated by the water flow may hold a person against a water outlet. Some current spa controllers monitor an external safety signal, e.g. a signal from a vacuum switch 213 (FIG. 2) located in the water flow path adjacent the input to the water pump 80, designed to indicate this and turn off all pumps when the signal is asserted. The pumps are not allowed to turn back on until the spa user presses a button on the panel to acknowledge the condition. In an exemplary embodiment, in accordance with a further aspect of this disclosure, the external signal is checked again after the pumps have been turned off. If the external signal is still asserted, an alarm may be activated (e.g., a visible message on a control panel display, and/or an audible warning), and the GFCI is tripped to turn off all pumps. In an exemplary embodiment, the alarm may turn off when the GFCI trips, since power is removed from the system, but if the spa remains powered for whatever reason, the alarm will continue to provide a warning to the user.

Figure 2:
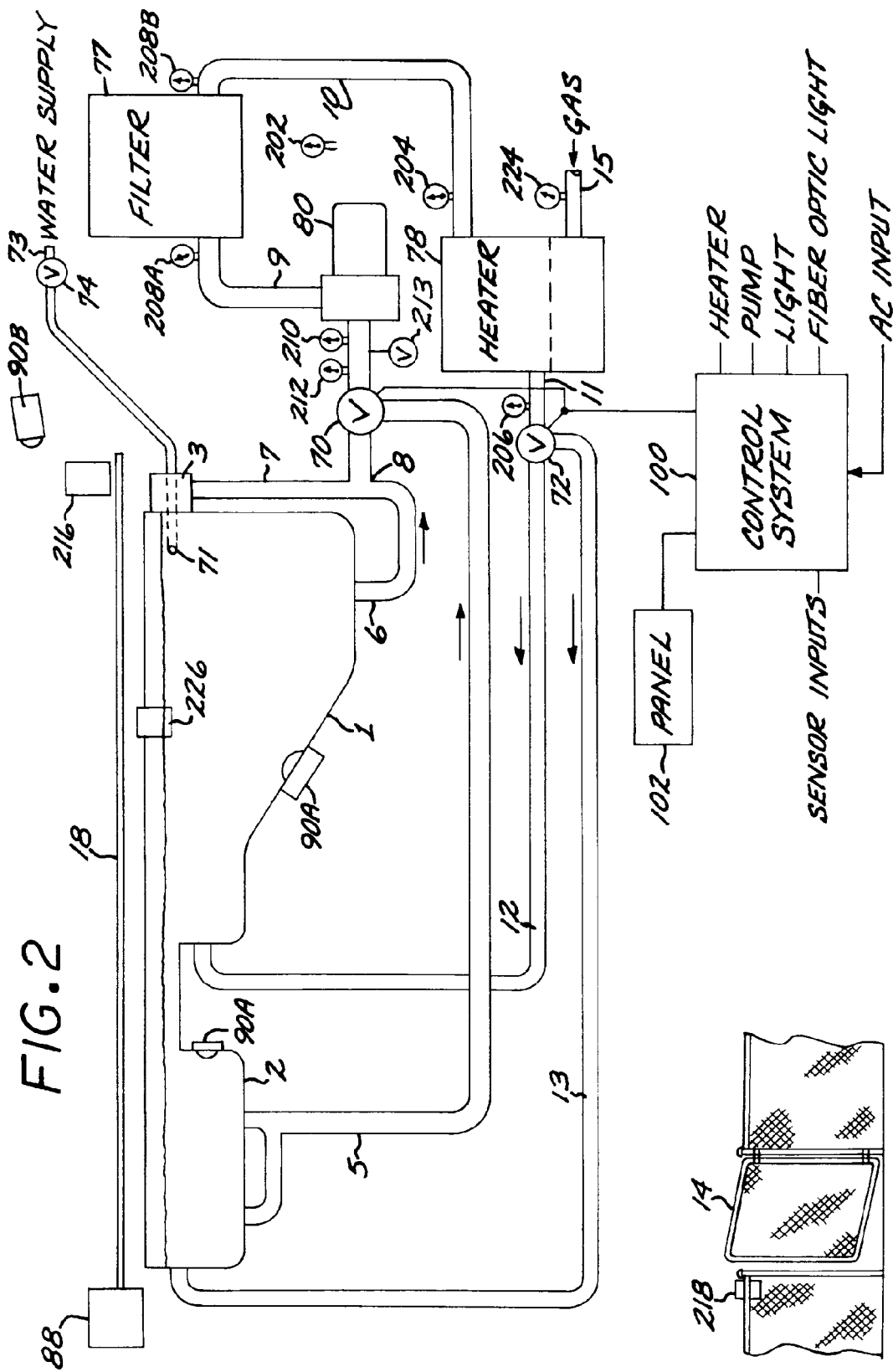
FIG. 2 is a diagrammatic view of an exemplary embodiment of a pool and spa system utilizing aspects of this invention.

An exemplary embodiment of a system which may include the foregoing features is shown in FIG. 2, a diagrammatic view of a pool and spa system. Aspects of the system are described in further detail in U.S. Pat. No. 6,407,469, the entire contents of which are incorporated herein by this reference. In this embodiment, the pool 1 and spa 2 share filter 77 and heater 78 through a plumbing arrangement including three-way valves 70 and 72, although other arrangements can be employed, such as separate heaters and filters for the pool 1 and spa 2. A skimmer 3 is included, and its drain line 7 and the pool drain line 6 are joined at a junction tee before connection to one input of the valve 70. The drain line 5 from the spa is connected to the other input of valve 70. The valve output is connected to the input side of the filter pump 80 through water line 8. A water line 9 runs from the pump output to the filter input. The filter output is connected by water line 10 to the heater input. The heater output 11 is connected to the input of the three-way valve 72. One output of the valve is connected to water line 12 leading to a pool inlet. The other output of valve 72 is connected to water line 13 leading to a spa inlet.

The system includes pool and spa lights 90A, yard lights 90B, and a decorative fiber optic lighting system 88 typically mounted along the pool coping.

A controller and power distribution system 100 controls operation of the system 50, and which receives AC line voltage service, and distributes line voltage to the line voltage loads, including the heater, pump, lights and fiber optic lighting. The controller 100 further controls the operation of the line voltage loads, and the valves 70 and 72. Moreover, the controller 100 may receive input data from a variety of sensors, which may include, depending on the particular installation, a gate open alarm 218, a pool cover alarm 216, water pressure sensors 208A (filter input pressure) and 208B (filter output pressure), vacuum switch 213, gas pressure 224 for the gas supply line 15 to the heater, temperature sensor 204 (temperature of water entering the heater), temperature sensor 206 (temperature of water leaving the heater), water pH sensor 212 and oxygen reduction potential (ORP) sensor 210 and 212 in the water line 8. A master control panel 102 is coupled to the controller 100 for providing a display and command and data input device by which the system 100 may communicate with a user. The locations of the various sensors may vary depending on the installation. For example, the water temperature sensor 204 may alternatively be placed at the inlet to the pump 80, in the water line between the valve 70 and the pump 80.

FIG. 3 is a simplified block diagram of a pool service system 50. This embodiment will be described in the context of a residential pool with spa as illustrated in FIG. 2, although it is to be understood that the system can be utilized with larger pool installations, such as hotel/motel pool or spa systems and the like. The system includes the controller and power distribution system 100, which receives AC line power from the main or sub line voltage distribution panel 40. In this example, the panel 40 supplies 50 Amp service on line voltage wiring 60A, which is connected to a ground fault circuit interrupter (GFCI) 62, and then through line voltage wiring 60B to the controller and power distribution system 100. The system 100 distributes line voltage power to various line voltage loads, and also includes a low voltage transforming function to provide low voltage AC and DC power at various low voltages needed by the electronic devices and low voltage loads.

In this exemplary embodiment, the main line voltage power is provided through a single main line voltage service connection 60A, 60B and GFCI 62 to system 100, rather than through a plurality of line voltage service connections each with its own GFCI and circuit breaker circuit. The system 100 is not limited to the 50 Amp main line service, and can include auxiliary line services, which can be used to power auxiliary loads through conventional circuit breaker-protected connections. Typically these auxiliary connections are made on auxiliary circuit boards mounted in the control cabinet. Alternatively, the system may include modules powered through a plurality of GFCI devices.

The system 50 may include the master pool control panel 102 as well as a spa control panel 104. The control panel can be located inside the residence, adjacent a door leading out to the pool, or in other locations convenient for the user. The control panel could also be installed on the cover of the controller cabinet 112. The spa control panel 104 is typically located adjacent the spa for convenient access by spa users.

FIG. 4 illustrates an exemplary embodiment of a control panel cabinet 110 for housing the system 100, and which also includes a service control panel 112, which includes several touch switches 112A and status indicator lights 112B. Exemplary techniques for constructing a suitable control panel are described in U.S. Pat. No. 5,332,944. The switches permit user commands to be entered at the cabinet 110. If the pool control panel is mounted on the cover of the cabinet 110, the service panel may be omitted. The service panel may be provided with user input means for operating the controlled devices. For example, the service panel 112 in this exemplary embodiment includes manually actuated control switches/buttons, used to turn on or enable the filter pump, the pool and spa lights, the heater, and auxiliary buttons which can be used for such features as the cleaner pump, yard lights, an auxiliary valve, a fiber optic decorative lighting system and an auxiliary pump. Alternatively, a menu system or touchscreen may be employed, from which the controlled devices can be operated and settings changed. The service panel may be located on the exterior of the hinged lockable cover for the cabinet 110, and in an exemplary embodiment is water resistant.

FIG. 5 illustrates the master control panel 102, which in this exemplary embodiment includes an LCD or other display 102A, panel switches 102B and indicator lights 102C. This panel 102 includes a display for displaying to the operator various status information and messages, and controls which permit the operator to enter commands or input data to the system 100. The switches accept user commands and inputs, to initiate system actions or enter information into the controller 100. For example, the switches or buttons can include up and down buttons for temperature control and programming, a filter button for activating the filter pump, a light button for controlling the pool and spa lights, a spa button which controls the valves 70 and 72, turns on the spa jet pump, and turns off the cleaner pump if the system is so equipped, a heater enable button to enable operation of the heater, a program button to put the system in a programming mode, and auxiliary buttons which can be used for such features as the cleaner pump, yard lights, an auxiliary valve, a fiber optic decorative lighting system and an auxiliary pump.

FIG. 6 is a similar view of the spa control panel 104, which also includes an LCD or other display 104A, panel switches/buttons 104B and indicator lights 104C, which accepts user commands and inputs, to initiate systems actions or enter information into the controller 100. In an exemplary embodiment, there are several buttons, including a button for temperature control, buttons to control the spa jets (valves and filter pump) and an optional jet pump, a spa light button, and an auxiliary button. The panel 104 is mounted at or near the spa 2, above the water line. A low voltage cable runs from the panel to the controller system 100 in this exemplary embodiment.

Figure 7:
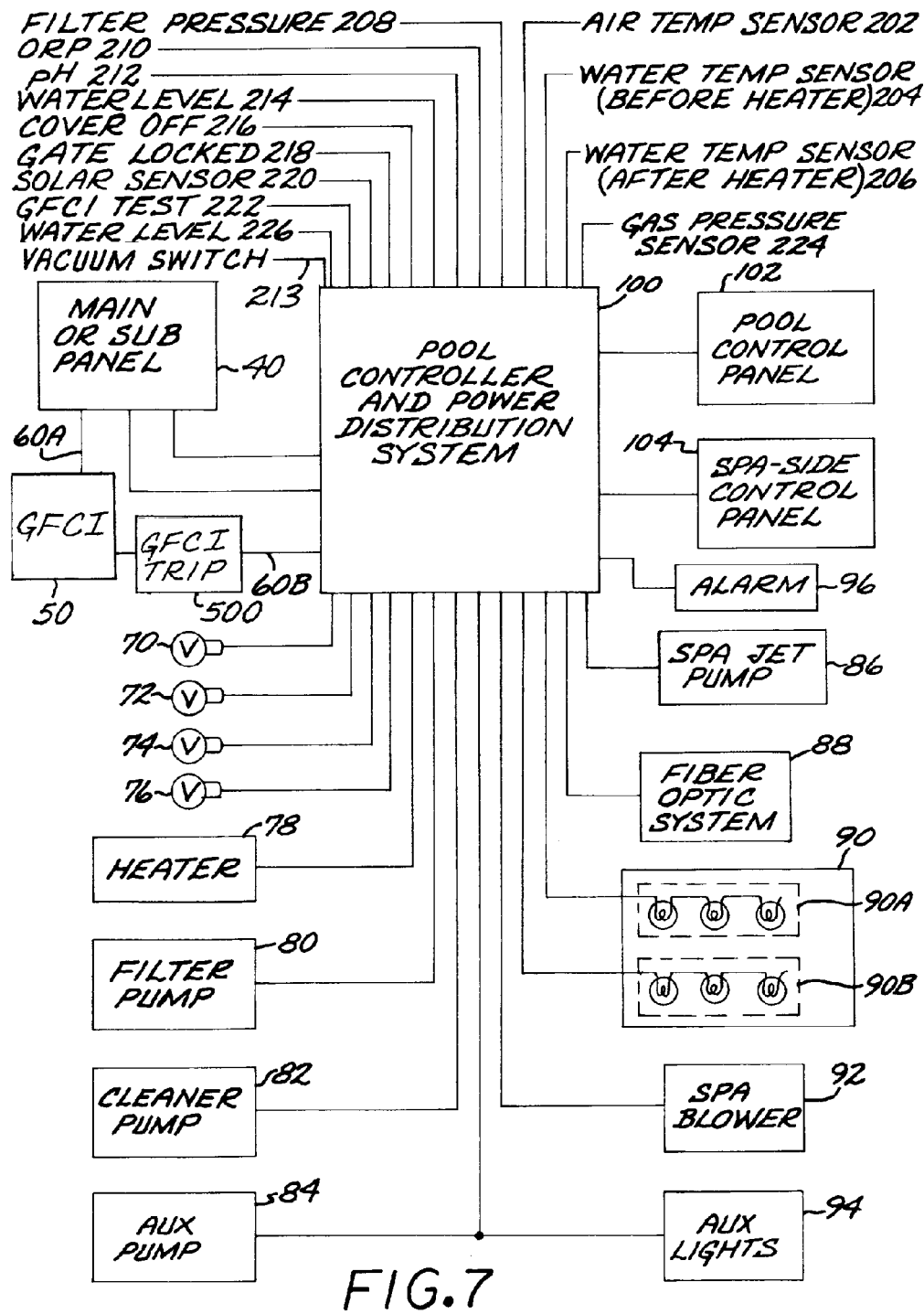
FIG. 7 is a detailed block diagram of the pool service of FIG. 3.

FIG. 7 is a schematic block diagram of an exemplary embodiment of the pool/spa service system 50. The service system includes a number of components which require electrical power for operation and/or control. The electrical power at line voltage is routed through a pool/spa controller and power distribution system 100. Primary electrical power in this exemplary embodiment is by the 50 Amp primary service 60A from the main panel or 100 Amp sub panel 40. Of course, the particular ampere ratings for the circuits of this system are merely exemplary, and could be varied in accordance with the demands of particular applications. The primary service 60A is provided with a ground fault circuit interrupter (GFCI) 62, to provide ground fault protection for the primary power service to the system.

In an exemplary embodiment, the primary line voltage service 60A may be provided by a 240 VAC line feed, comprising in a typical installation a neutral conductor, a ground conductor, a first voltage phase conductor and a second voltage phase conductor. These conductors are conventionally color coded, so that according to the coding convention, the ground conductor has green insulation, the neutral conductor has white insulation, the first voltage phase conductor has black insulation and the second voltage phase conductor has red insulation. The black conductor has a first polarity phase with respect to the neutral conductor, and the red conductor has a second polarity phase with respect to the neutral conductor, and 180 degrees different from the phase of the first polarity phase, such that 120 VAC is developed between the neutral and the black conductors, 120 VAC is developed between the neutral and the red conductors, and 240 VAC is developed between the black and the red conductors.

Various exemplary components which are controlled and/or receive electrical operating power through the system 100 are shown in FIG. 7. These components can include the valves 70, 72, 74, the water fill spout valve 76, the water heater 78, the filter pump 80, the cleaner pump 82, an auxiliary pump 84, a spa jet pump 86, the decorative fiber optic system 88, lighting system 90, spa blower 92 and auxiliary lights 94. The foregoing particular components is an illustrative listing; for any given pool or spa installation, some of the components may be omitted, and other components may be added, all depending on the design of the particular installation.

Still referring to FIG. 2, the pool\spa controller 100 receives input data signals from various sensors and input sources. These may include several temperature sensors, the air temperature sensor 202 for providing ambient air temperature, the water temperature sensor 204 for providing the temperature of the water at the input to the heater, and the water temperature sensor 206 for providing the temperature of the water at the output of the heater. Other sensors may include the filter backpressure sensor system 208 comprising pressure sensors 208A and 208B (FIG. 2), ORP sensor 210, pH sensor 212, vacuum switch or sensor 213, water level sensor 214 for providing a pool water level indication, a "cover off" sensor 216, a "gate locked" sensor 218, and a solar sensor 220 for detecting the temperature at a solar heater. The controller may respond to the solar temperature, to actuate a valve to divert water to pass through a solar heater, if the installation is so equipped, instead of through the water heater. The water level sensor for example may include a probe which extends into an area at which the water level will reach at a desired fill level, and sense the presence or absence of water at this level.

In an exemplary embodiment, a 50 Amp line power connection may be made between the main panel 40 for the residence directly to the pool/spa controller and distribution system 100, through the 50 Amp GFCI 62 and a GFCI trip circuit 500. The system 100 has thereon the necessary terminal connections for direct connection of the line voltage service conductors (black, red, white, green) for the 50 Amp service. Circuit protection for the various devices such as the heater 78, filter pump 80, cleaner pump 82 and auxiliary pump 84 may be provided by circuit protection devices, e.g. fuses, mounted on the pool controller circuit board in the pool controller cabinet.

Figure 8:
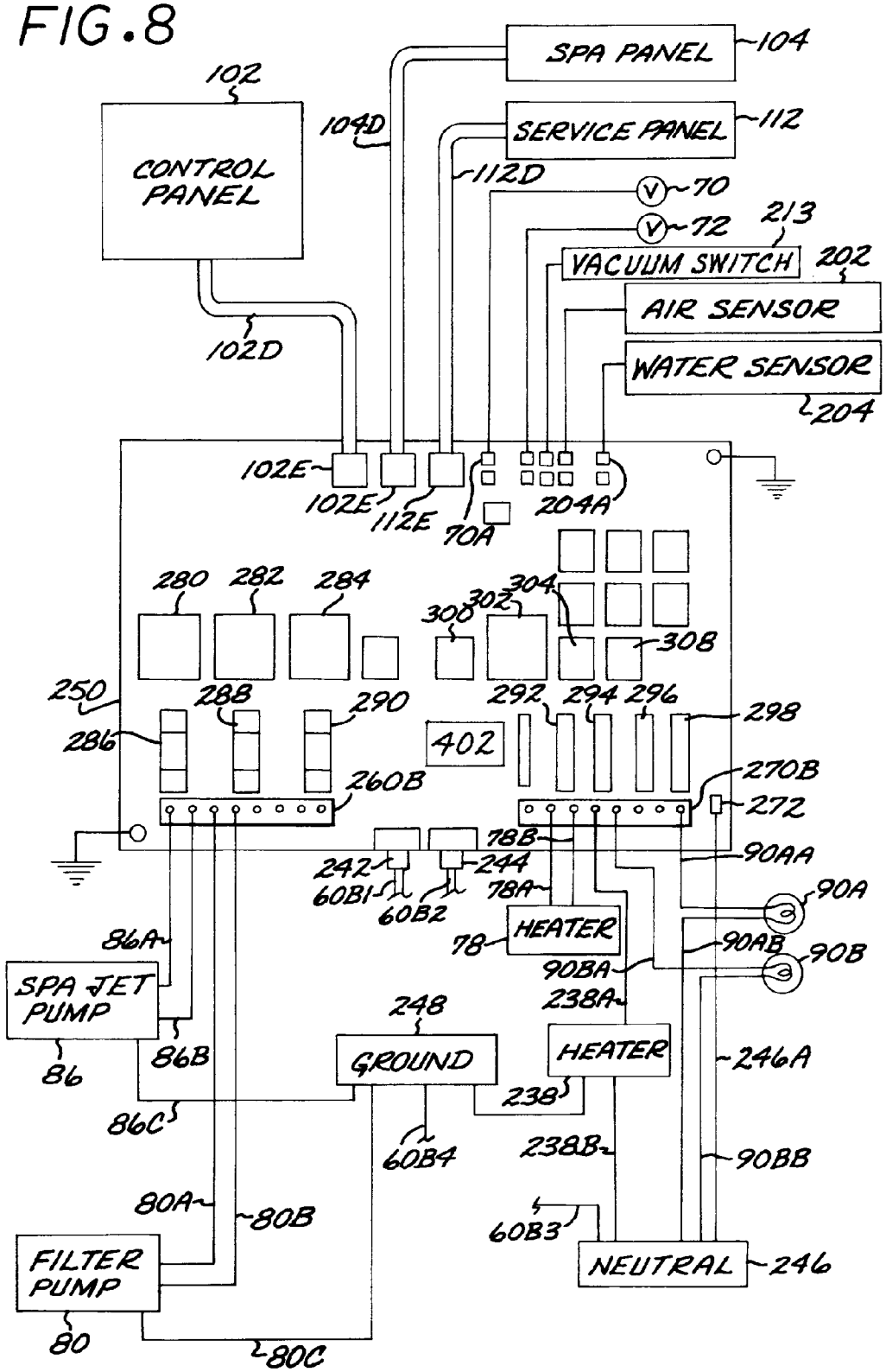
FIG. 8 is a schematic diagram of an exemplary embodiment of a simplified pool service system.

FIG. 8 is a simplified wiring diagram for an exemplary pool and spa installation. For some installations, not all sensors and controlled devices may be needed or desired by the owner, and the system shown in FIG. 8 does not explicitly show the identical complement of controlled devices and sensors as shown for the system of FIG. 7. The same controller circuit board may be used in this installation as well as in the system shown in FIG. 7. The exemplary installation of FIG. 8 includes controlled valves 70 and 72, air temperature sensor 202, water temperature sensor 204 which measures the temperature at the inlet to the heater, which should be the same as the water temperature in the pool or spa, vacuum switch or sensor 213, spa jet pump 86, filter pump 80, water heater 78, spa lights 90A and yard lights 90B.

An exemplary embodiment of the circuit board 250 is diagrammatically depicted in FIG. 8, and is connected to the line voltage connectors 242 and 244, attached to a terminal block connector. The neutral bus 246 is attached to the terminal block, and a neutral connection 246A is made to the circuit board. The neutral (white) conductor 60B3 from the 240 VAC, 50 A service is connected to the neutral bus. The ground (green) conductor 60B4 from the 50 A service is connected to a ground bus 248 attached to a cabinet. The board 250 includes printed wiring conductor patterns which connect the various circuit devices mounted on the board and the connector terminals.

The exemplary installation illustrated in FIG. 8 includes two 240 VAC loads, the spa jet pump 86 and the filter pump 80. These loads are connected to 240 VAC service through a 240 VAC connector comprising a first connector structure mounted on the top surface of the circuit board, and a removable connector structure 260B (FIG. 8) to which insulated conductors or wires are connected running to the loads. The respective connector structures have respective pins and corresponding plug receptacles which mate together when the connector structure are mated.

Respective terminals of the connector structure 260B may be electrically connected to a board printed wiring trace running to the connector 242, and other connections to other terminals of the connector structure 260B are made through switching relays and fuses to a wiring trace to the connector 244. By appropriate connection to respective terminals of the connector structure, 240V service is available. Insulated conductor 86A is connected to a "red" terminal connection, i.e. a connection which is electrically connected to connector 242, to which the red conductor of the 240V service is connected. Conductor 86B is connected to a "black" terminal connection, i.e. a connection which is electrically connected through a relay and fuse to connector 244, to which the black conductor of the 240V service is connected. Conductor 86C connects the ground bus 248 to the spa jet pump.

Similar connections may be made to the filter pump 80 to provide 240V service. Thus, wire 80A is connected to another "red" terminal connection on connector 260B, wire 80B is connected to a "black" terminal connection on connector 260B, and wire 80C connects the ground bus 248 to the filter pump.

In this exemplary embodiment, the 240 VAC loads are controlled by respective switch devices, e.g. non-latching relays, in turn controlled by the system controller. Each load circuit is also protected from excessive current draw by a fuse device. Thus, the spa jet pump 86 is controlled by relay 280 and circuit protection is provided by fuse 286, respectively mounted on the circuit board 250. To accomplish this, a series circuit connection is made between a circuit trace, relay 280 and fuse 286 to the corresponding terminal on connector structure, using solder connections to wiring traces formed as part of the board 250. The filter pump 80 is controlled by relay 282 and circuit protection is provided by fuse 288. A spare 240V service circuit is provided, with relay 284 and fuse 290.

The circuit board 250 further has a 120V service connector, also comprising a fixed connector structure mounted to the board, and a removable connector structure 270B (FIG. 8) connectable to the fixed connector structure. These connector structures can be implemented in the same manner as the 240V connector structures, further facilitating field wiring of the controller system. Insulated wires running to the load devices are attached to the removable connector structure 270B. Respective terminals of the fixed connector structure are electrically connected via wiring traces of the circuit board to the red connector 242, the black connector 244 and the neutral connector 272 in turn connected to the neutral bus 246 via wire 246A. Thus, 120V service of either phase (red or black) is available at the connector 270. The heater 78 is wired to the connector 270 by wires 78A, 78B. When the controller system calls for heat, 120 VAC power to activate the heater is supplied, which enables all ignition and temperature regulating functions of the heater. The heater in turn ignites gas supplied to its internal gas valve and burner, heating the water which is flowing from the pump and filter. The spa light circuit 90A is connected to a black polarity connection at connector 270B by wire 90AA, and to the neutral bus 246 by wire 90AB. The yard lights 90B are connected to a red polarity connection at connector 270B by wire 90BA, and to the neutral bus 246 by wire 90BB. Provision is made for an optional 120V load device 238, e.g. an electrical water heater, which can be connected to connector 270B by wire 238A, and to the neutral bus 246 by wire 238B.

In an exemplary embodiment, each 120 VAC circuit connected through the connector 270 is controlled by a switch device actuated by the microcomputer 402, with circuit protection provided by a corresponding fuse, respectively mounted on the circuit board 250. The switch device and a corresponding fuse are connected in series between a corresponding line voltage wiring trace (i.e., black, red, white) and a terminal of the 120V connector structure. The heater is controlled by relay 300, with circuit protection provided by fuse 292. The optional load 238 is controlled by relay 302 and protected by fuse 294. The yard light circuit 90B is controlled by relay 304, and protected by fuse 296. The spa light circuit 90A is controlled by relay 308, and protected by fuse 298.

In an exemplary embodiment, the controller system 100 includes a microprocessor 402 such as a Pic 16C65A CMOS microcomputer marketed by Microchip, which accepts information from a variety of sensors and acts on the information, operating, for example, according to instructions described more fully in FIGS. 14A-14F of U.S. Pat. No. 6,407,469. The control system also includes a non-volatile memory 403 (FIG. 1). The controller system is not limited to the use of a controller including a microcomputer or microprocessor, whose functions can instead be performed by other circuitry, including, by way of example only, an ASIC, or by discrete logic circuitry.

In an exemplary embodiment of a controller system programmed or adapted to perform a GFCI trip Algorithm, the system may include a configuration setting, gF (.n/.1/.2/.3/.4/.5/.6/.7), to be enabled (gF is set to any setting other than .n) for a GFCI trip algorithm to function. In such an exemplary embodiment, the GFCI trip algorithm will not function when the setting is not enabled. In this embodiment, the GFCI trip Algorithm is enabled when gF is set to any value other than n; conversely, when gF is set to n, the GFCI trip algorithm is disabled.

In an exemplary embodiment, the GFCI trip algorithm may have the following states:

Disabled May be disabled as described above. (gF is set to n)

Armed The GFCI will trip within the number of days specified by gF setting (gF=1 for 1 day delay, gF=2 for 2 day delay, and so on), if not tripped manually earlier.

Imminent The GFCI will trip within a random number of seconds.

Tripping The GFCI is attempting to trip the GFCI right now.

Passed Last GFCI trip succeeded, so no more automatic trips will occur.

Failed The Tripping state went on too long without losing power.

In an exemplary embodiment, this GFCI state is preserved across power cyclings by storage in a nonvolatile memory.

Upon entering the Tripping state in an exemplary embodiment, the controller microprocessor issues a command to turn on the GFCI switch element, e.g. a triac or relay, for between 200 and 300 ms (to prevent burning out the resistor), then waits about 100 ms more (after turning off the GFCI switch element) to allow for the worst-case power loss detection time. In an exemplary embodiment, power loss is detected by a zero crossing detector, which is connected to an AC signal; power loss is detected when the squared AC zero crossing input signal ceases to cycle. One exemplary circuit for detecting nulls in the power waveform is described in U.S. Pat. No. 6,643,108, at FIG. 15 and column 13, lines 48-57. If power loss is not detected by that point, the GFCI trip algorithm switches to the Failed state. Upon entering the Failed state, the algorithm raises a GFCI Failed condition, which acts like a typical fault condition except that the panel displays "gFI" and the fault condition cannot be reset with a button press, in an exemplary embodiment. For the exemplary embodiment, the fault condition can only be reset by cycling power.

In an exemplary embodiment, upon power up, if the microprocessor finds that it is in the Tripping state (which means the GFCI trip worked), the GFCI trip algorithm switches to the Passed state. Upon power up, if the GFCI trip algorithm finds that it is in the Failed state (which means the GFCI didn't trip) or Imminent state (which means the spa lost power for some other reason just before the GFCI was scheduled to be tripped), the GFCI trip algorithm switches to Armed state.

In an exemplary embodiment, upon power up, if the microprocessor GFCI trip algorithm is in the Armed state, it remains in the Armed state. A newly powered up microprocessor initializes to Armed.

In an exemplary embodiment, if, after a power up state evaluation, Armed is the state, a transition to Imminent state is scheduled for the number of days later specified by the gF setting (each day being 24 hours since power-up).

In an exemplary embodiment, when the Imminent state is initiated (either due to a scheduled transition or a GFCI Trip Manually command), a transition to Tripping state is scheduled for a "random" number of seconds (e.g., between about 0 and 10 seconds) later. In an exemplary embodiment, there may be some means provided for a spa technician (but not the end user) to request the GFCI to be tripped as a test of the GFCI. For example, there may be a test mode DIP switch on the controller circuit board with a setting to put the controller in a test mode, and in the test mode, there may be a predetermined series of control panel button pushes (known to the technician) to initiate a GFCI test trip. Since the control panel cover is typically removed to access the DIP switch, this feature may be available to a spa technician, but not the end user.

In an exemplary embodiment, the actual moment at which the GFCI will be tripped by the algorithm will not be predictable, to make it hard for anyone to manually simulate a GFCI. During the Imminent state, the user interface (as well as the logging of faults into a fault log) will be locked out so that no further changes to the system can be made before power is lost. This will allow time for any pending updates to the nonvolatile memory 403 (e.g. an EEPROM) to be written before the Triggered state is entered, so that Triggered state can immediately be recorded in the memory.

If power is not lost after tripping the GFCI trip circuit and the Failed state is entered, normal memory activity can be resumed. If power is lost, then normal memory activity will resume upon the next power-up.

During normal operation, if the power fails for any reason other than a software-initiated intentional GFCI trip, there may be no way for the software to tell if the GFCI tripped the power or if the power failed for some other reason. Therefore the software will act normally on any power up once in Passed state.

Stuck Relay Detection Algorithm. In an exemplary embodiment, the controller system includes a timer that has to run for a certain time period, e.g. a certain number of hours, before a stuck relay condition is raised. The timer starts counting hours from 0 when the water temperature is at a predetermined initial threshold temperature, e.g. 110° F., or above. The timer is stopped if the water temperature falls to a predetermined temperature value which is lower than the initial threshold, e.g. 107° F., or below. (The spa system may include an Economy or Sleep mode. In an exemplary embodiment the water temperature sensor may be located in the water recirculation path adjacent the input to the water heater. If the spa is in Economy or Sleep mode, during which the water heater and pump are not cycled, the controller may not realize the water temperature is 110° F. or above until it gets to the next filter cycle, which in an exemplary embodiment may only happen once every 24 hours. The temperature sensor may not accurately reflect the water temperature in the spa tub or pool in this case. In an exemplary embodiment, even with the spa in an Economy or Sleep mode, a filter cycle is performed every 24 hours, during which the pump is activated and a temperature reading can be taken which is indicative of the water temperature in the spa or pool. In other embodiments, the water temperature sensor may be located so as to directly measure the water temperature in the spa or pool, and hence the sensor reading reflects the water temperature whether the pump is running or not.) In an exemplary embodiment, since the temperature is measured while the timer is running, the heating pump will not be shut off by any overheat-related faults, and will continue to poll even in a Sleep or Economy mode, once an hour, starting one hour after the first such "fault" (i.e. starting and running the timer) lasting an hour or more is declared, during all such faults while the timer is running. This one-hour hold off should prevent most heater-caused overheats from causing false positives.

In an exemplary embodiment, if the temperature ever reliably trends downwardly, the timer will restart from 0. For example, this should eliminate the condition in which the sensed temperature value alternates between going up and then down for a series of readings. This timer restart will weed out many conditions which cause the temperature to rise for a while but then fall.

In an exemplary embodiment, the controller system will, in the following conditions, enter or declare a "Stuck Relay" fault (displayed as "Stu" on control panel displays), and set a "Hot" flag in nonvolatile memory 403, then after 15 seconds put the GFCI trip Algorithm into the "Imminent" state, thus tripping the GFCI within a dozen or so seconds in an exemplary embodiment.

(i) If the water temperature has risen at least 3° F. degrees in the last hours, and is now greater than or equal to 116° F., and the timer has been running for at least 5 hours (since the last restart from 0).

(ii) If the water temperature has risen at least 3° F. degrees since the timer last restarted, and is now greater than or equal to 120° F., and the timer has been running for at least 10 hours (since the last restart from 0).

(iii) If the water temperature has risen at least 2° F. degrees since the timer last restarted, and is now greater than or equal to 120° F., and the timer has been running for at least 24 hours (since the last restart from 0).

A reason for using three different criteria for declaring a "stuck relay" condition, based on a water temperature sensor reading, is to avoid false positives caused by such factors such as a baking sun for the installation, e.g. one in Phoenix, Ariz. To avoid needlessly tripping the GFCI, if the temperature is rising very slowly due to the baking sun, waiting a relatively long period of time to declare a "stuck relay" condition results in the time window encompassing a night time when the temperature will fall. Similarly, waiting a relatively long period of time to declare a "Stuck Relay" condition when the temperature is rising quickly, e.g. from a user filling a spa with water from a hot water faucet, will prevent an undesirable tripping of the GFCI due to such a condition, since the water should cool down after being released into the spa or pool.

Although the foregoing exemplary embodiment uses a water temperature sensor reading, e.g. a water sensor that detects the temperature of water flowing into the heater, other techniques for detecting temperature creep while eliminating false positives could be employed. For example, an air temperature sensor and/or a solar sensor could be used by the electronic controller to eliminate a baking sun as a cause for GFCI tripping. In one exemplary embodiment, a method is provided for detecting a malfunctioning pump switch, e.g. a stuck pump relay, in a bathing installation having a water holding structure, a recirculating water flow path and an electrically powered pump actuated by the pump switch for recirculating water through the water flow path, which includes monitoring a water temperature of water in the water holding structure or water flow path over time, processing a rise in the water temperature over time and monitored temperature values in an algorithm performed by a microprocessor to characterize the rise in temperature and to decide whether the rise is more likely to have been caused by a malfunction in the pump switch, resulting in continuous pump operation, than by another cause of a rise in temperature. This decision may be used to initiate tripping the GFCI.

In an exemplary embodiment, if the GFCI trip algorithm is disabled for a given installation, then the Stuck Relay fault will persist until power is turned off, instead of going to GFCI Imminent state. However, the "Hot" flag will still be set. Thus stuck relay detection will be usable on such an installation, even though GFCI tripping isn't available.

In an exemplary embodiment, if the GFCI trip algorithm is enabled but not yet "Passed," a "Stuck Relay" fault will still try to trip the GFCI, in the expectation that trip circuit and algorithm are working. But if not working, a "GFCI Failed" fault will replace the "Stuck Relay" fault; however, the Hot flag will still be set. In an exemplary embodiment, a "GFCI Failed" condition has display priority over a "stuck" condition or a "hot" condition.

In an exemplary embodiment, if the spa powers up with the Hot flag set:

(i) if the spa powers up outside of a Test Mode, the controller system will immediately go into a "Hot" fault. After it goes into a "Hot" fault, and if the GFCI trip Algorithm is in the "Passed" state, it will go to "Imminent" State after 5 minutes.

(ii) if the GFCI trip Algorithm is not in the "Passed" state (presumably because it "Failed" or because it is "Disabled"), the algorithm will stay in the "Hot" fault until power down.

(iii) if the controller system powers up in the "Test" Mode, that will clear the "Hot" flag (thus the next power-up outside of Test Mode will be normal). In an exemplary embodiment, the spa controller system may be powered up in the Test mode by placing a DIP switch on the controller system board to a predetermined position, which in an exemplary embodiment will typically only be known to a qualified technician.

In an exemplary embodiment, freeze protection will be active during Stuck Relay faults and Hot faults. Freeze protection may be the automatic activation of water-stirring equipment (e.g. pumps, blowers, mister, etc.) when a temperature is detected, e.g. at some location in the water flow path, to be low enough that not activating the equipment would raise the danger of the plumbing freezing.

Figure 9A:
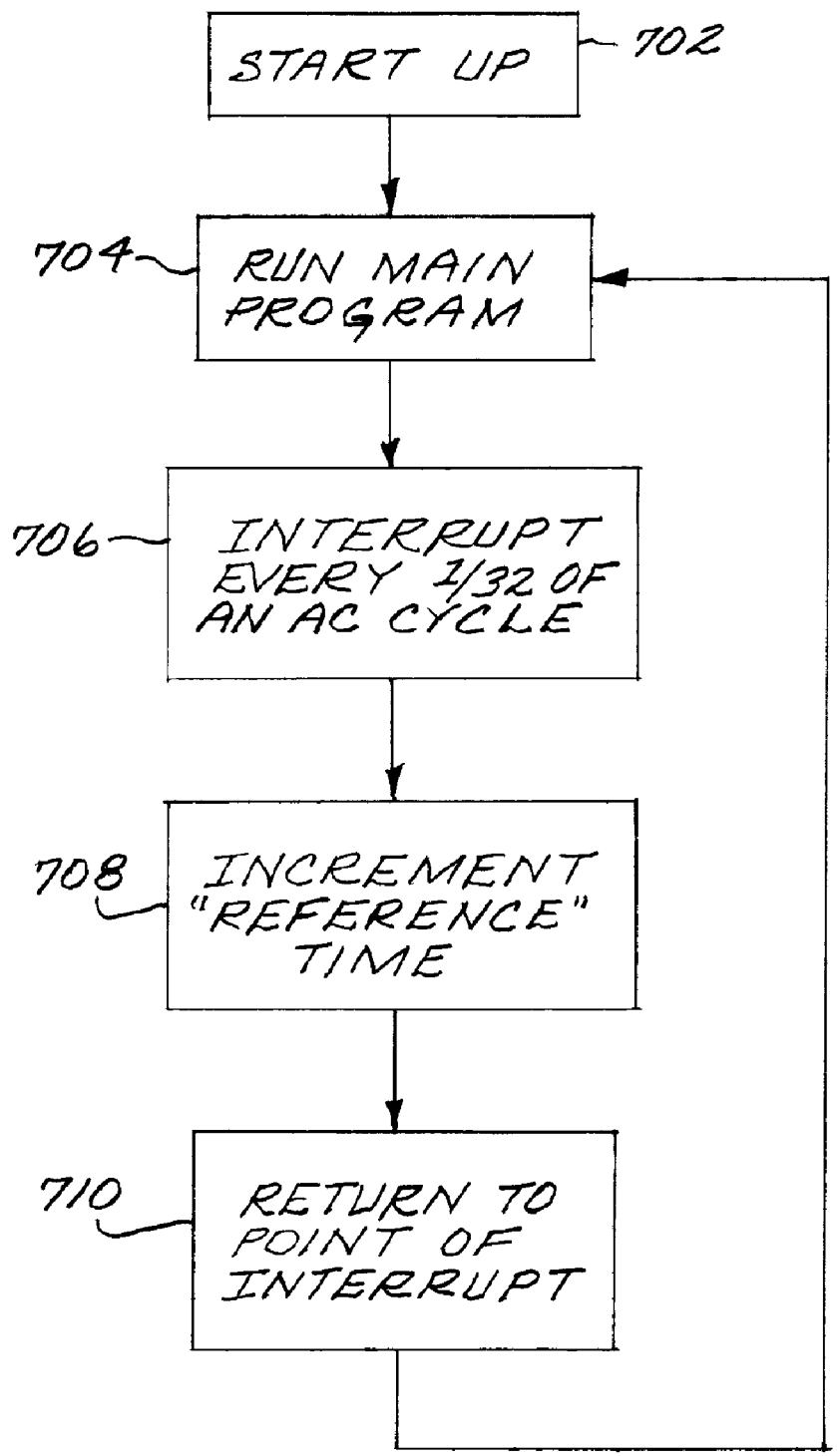
FIGS. 9A-9G are simplified flow diagrams illustrating exemplary salient program features of the controller comprising the system of FIG. 1, FIG. 2 or the system of FIG. 10.
Figure 9B:
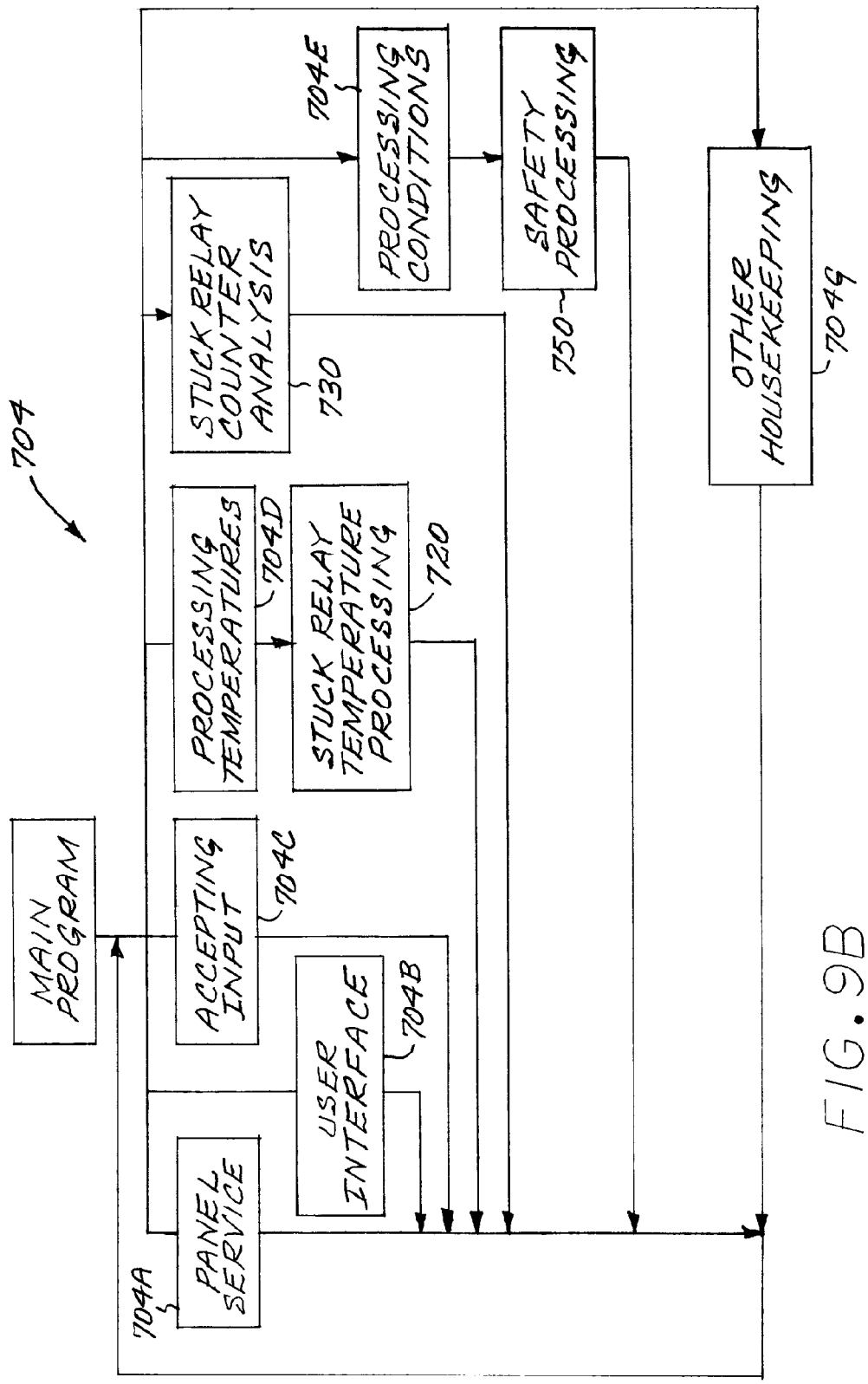

An exemplary main operational routine 700 illustrating the programmed operation of the microprocessor 402 is shown in FIG. 9A. A start-up procedure 702, illustrated in further detail in FIG. 9B, is commenced at the system power-up. The main program is run at 704. In this embodiment, the main program is a round-robin loop, in which many functions may be performed, e.g. panel service, user interface, accepting inputs from sensors and external devices, processing conditions and house-keeping functions. An interrupt occurs periodically, e.g. in this embodiment, every 1/32 of an AC cycle (i.e. 16.67 milliseconds, or about 20 milliseconds). In this exemplary embodiment, the purpose of the interrupt is to perform reference timekeeping. At 708, the reference time is updated, and operation returns to the main program at the point of interruption.

Aspects of an exemplary main program 704 are depicted in FIG. 9B. In one exemplary embodiment, at least some of the functions may be performed in parallel. In another embodiment, the functions may be performed serially. Functions performed in the main program include panel servicing 704A, which includes functions of communication of information between control panels and the main controller board, a user interface function 704B, which includes functions of interpreting the raw information communicated by function 704A, and an accepting input function 704C, which includes polling the sensors and switches comprising the system and communicating the raw sensor data to the main controller board.

Another function 704D performed by the main program in an exemplary embodiment is that of processing temperature sensor data received by function 704C. The processed temperature data is then processed further by a "stuck relay" temperature processing function 720. The main program 704 also performs a "stuck relay" counter analysis 730. Functions 720 and 730 are described more fully below.

Another function 704E performed during the main program in an exemplary embodiment is a processing conditions function, which processes various functions, one of which is a safety processing function 750, which is described more fully below.

Figure 9C:
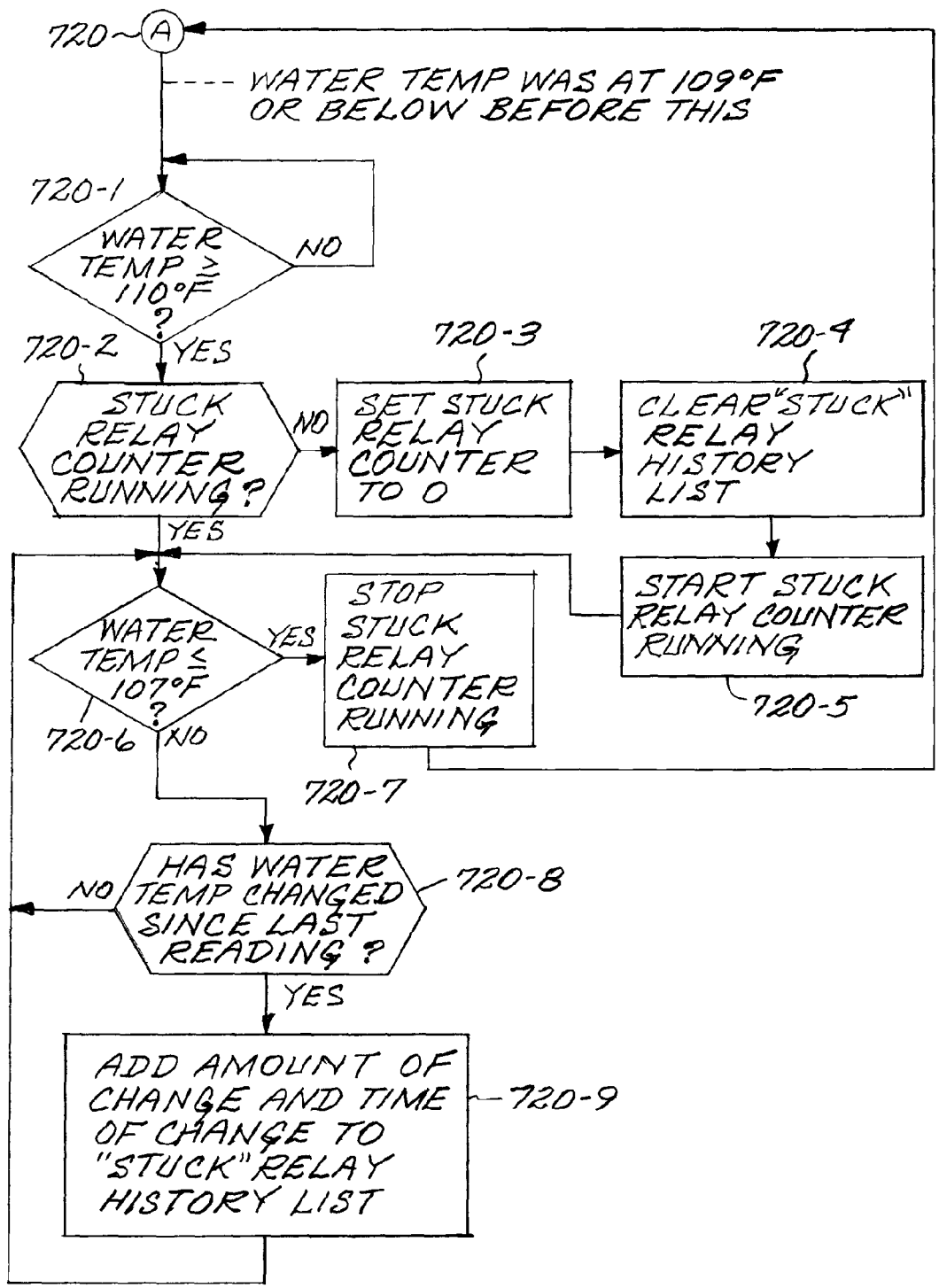

FIG. 9C illustrates an exemplary embodiment of a stuck relay temperature processing function 720, which is entered from the main program. This function is in a hold mode as long as the water temperature is at 109° F. or below, as represented by decision 720-1 with the loop back if the water temperature is not greater than or equal to 110° F. If the outcome of decision 720-1 is affirmative, operation proceeds to decision 720-2, where the running status of a stuck relay counter is checked. If the counter is not running, the counter state is set to zero at 720-3, the stuck relay history list is cleared at 720-4, and the stuck relay counter is started at 720-5. At 720-6, the water temperature is checked. If the temperature is less than or equal to 107° F., the stuck relay counter is stopped at 720-7, and operation returns to 720. If the temperature is greater than 107° F., operation loops between 720-8 and 720-6 until the temperature has changed from the last reading. The amount of the change and the time of the change is added to the stuck relay history list at 720-9, and operation loops back to 720-6.

Figures 1, 9D:
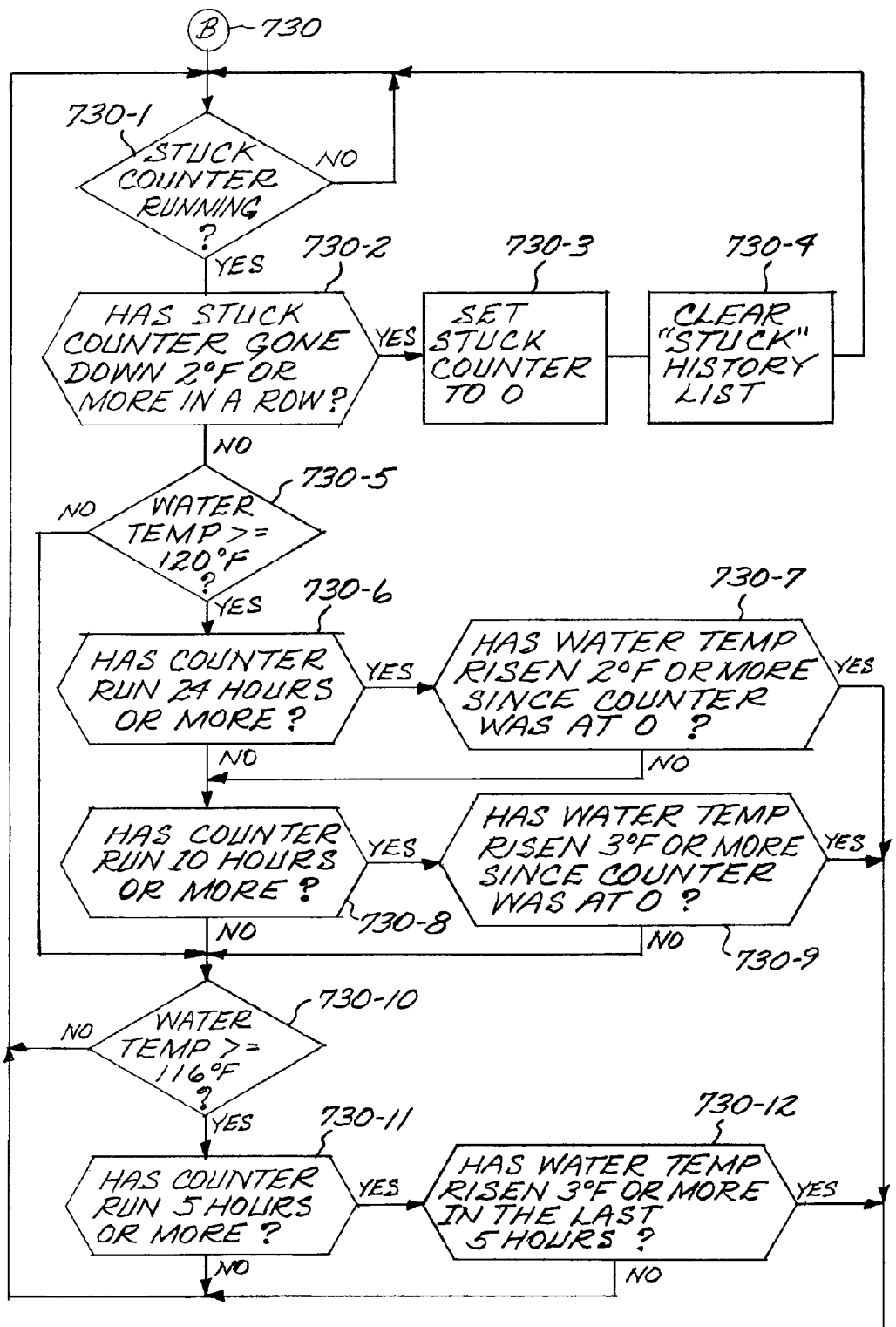
Figures 2, 9D:
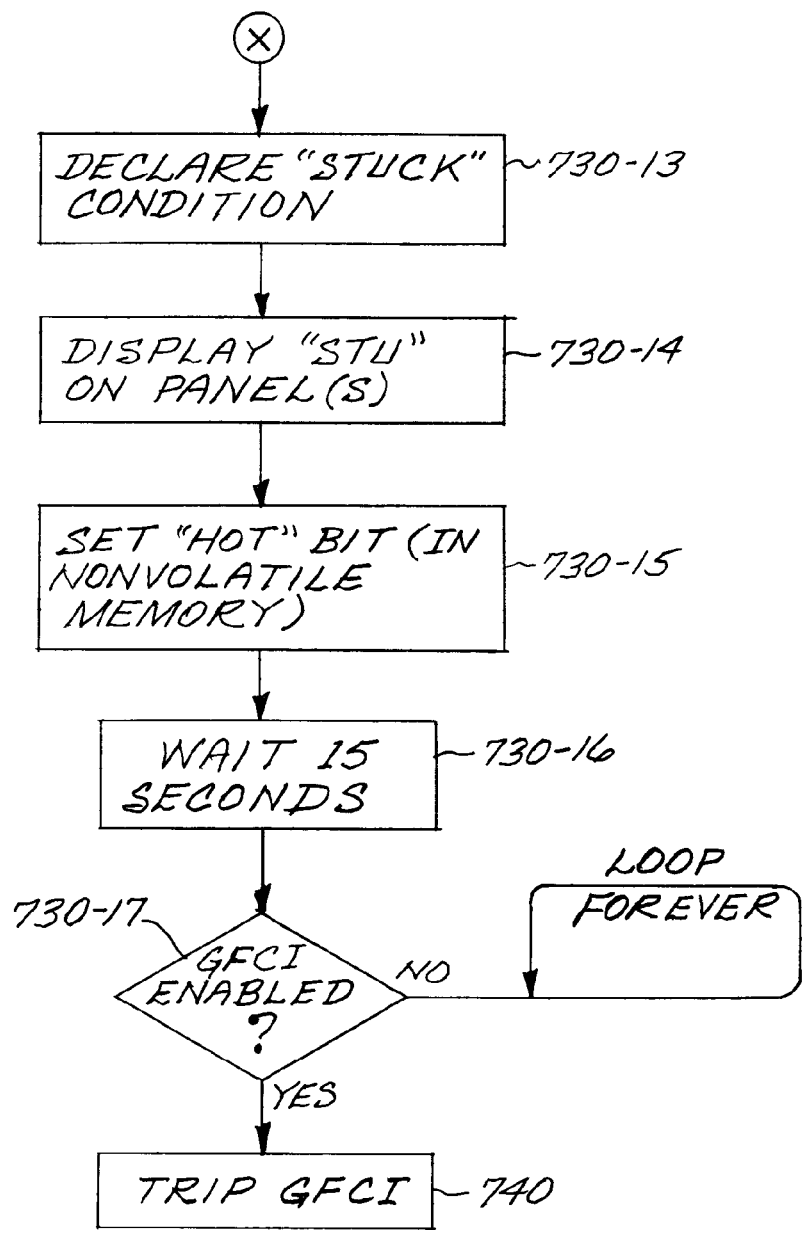

FIGS. 9D-1 and 9D-2 illustrates an exemplary embodiment of the stuck relay counter analysis process 730, entered from the main program. The stuck relay list has a record of changes in temperature, in the order in which they occurred, since the stuck relay counter last started running. At 730-1, the process will hold until the stuck relay counter is running. At 730-2, the counter state is tested, looking at the two most recent changes in temperature, and if they were both a decrease by 1 degree F. (or more), or if the last change by itself was 2 degrees F. (or more), the temperature will have gone down by 2° F. or more in a row. Since, in an exemplary embodiment, temperature is measured to a 1-degree resolution, the measurement is subject to noise causing the temperature to sometimes go down and back up by one degree. It is desired not to interpret this "noise" fluctuation as a temperature drop, but any further drop would be interpreted as a temperature drop. If affirmative at 730-2, then at 730-3, the stuck relay counter is set to zero, the stuck relay history list is cleared at 730-4, and operation returns to 730-1. If the counter state has not gone down by 2° F. or more in a row at 730-2, the process proceeds to 730-5. If at 730-5 the water temperature is not greater than or equal to a predetermined value, e.g. 120° F. in this example, operation branches to 730-10. If the water temperature does exceed the predetermined value at 730-5, the counter is checked at 730-6. If the counter has not run 24 hours or more, operation proceeds to 730-8. If the test at 730-6 is affirmative, operation proceeds to 730-7, a query as to whether the water temperature has risen 2° F. or more since the stuck relay counter was at zero. If no, operation branches to 730-8. If yes, operation proceeds to 730-13 (FIG. 9D-2).

Figure 9E:
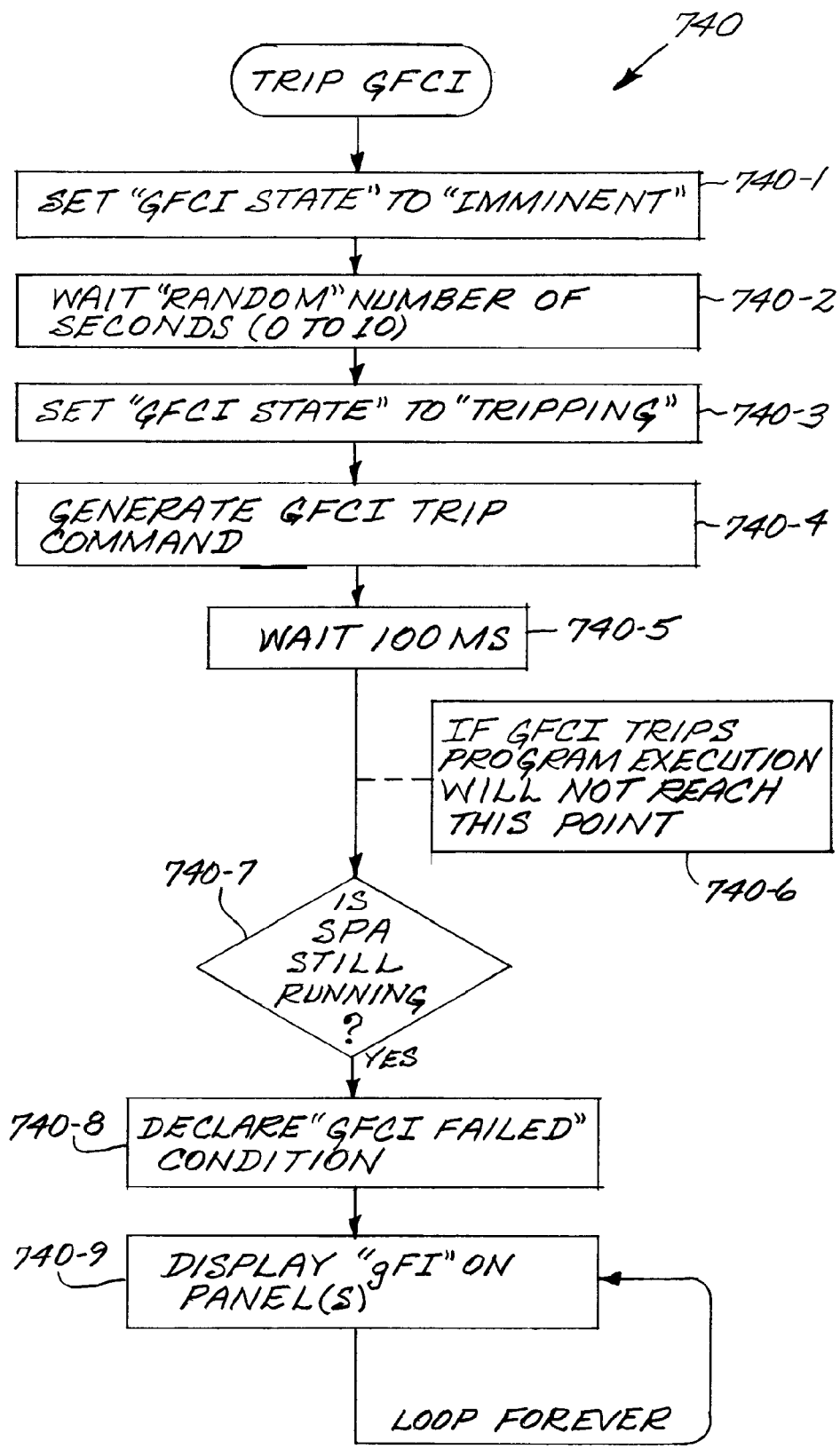

Query 730-8 determines whether the counter has run for ten hours or more. If so, at 730-9, it is determined whether the water temperature has risen 3° F. or more since the stuck counter relay was at zero. If yes, operation proceeds to 730-13. If not operation proceeds to 730-10, where a query is answered as to whether the water temperature is equal to or greater than 116° F. If not, operation returns to 730-1. If yes, operation proceeds to 730-11, where the counter run duration is tested. If the counter has not been running for 5 hours or more, operation returns to 730-1. If the counter has been running for 5 hours or more, then at 730-12, it is determined whether the water temperature has risen 3° F. or more in the last five hours. If not, operation returns to 730-1. If yes, operation proceeds to 730-13, where the "stuck" condition is declared. At 730-14, a warning message is displayed on the panel display, e.g. "STU." At 730-15, a "hot" bit or flag is set in nonvolatile memory. If the GFCI trip circuit function is enabled, the GFCI trip function 740 is performed (FIG. 9E). If the GFCI function is not enabled for the installed system, the function enters a continuous hold loop. The "hold" loop is only for this function; however, the "stuck" condition declared results in locking out most other activity on the spa. Some basic internal functions such as timekeeping will continue.

An exemplary embodiment of a GFCI trip function 740 is depicted in FIG. 9E, which may be entered from the function depicted in FIG. 9D, and also from the function depicted in FIG. 9, described below. At 740-1, the GFCI state is set to "imminent." The process waits a "random" or variable number of seconds, in an exemplary embodiment between one and ten seconds, at 740-2. In an exemplary embodiment, the wait time is computed from subunits of time, e.g. the seconds and tenths of seconds since the controller was powered up, with the tenths treated as more significant and only a modulo-8 of the seconds being used. The time when a technician presses a button is unrelated to the least-significant aspects of how long the controller has been powered up; it is virtually "random." In other words, the human action at an arbitrary time is the trigger for the variable number. Of course, other algorithms or techniques could be employed for determining the variable time. The GFCI state is then set to "tripping" at 740-3, and the controller generates a GFCI trip command to the trip circuit at 740-4, e.g. for a period of 200 to 300 milliseconds. The function waits for a time period after the command has been generated and turned off, e.g. 100 milliseconds, at 740-5. At this point, if the GFCI trip circuit and the GFCI have functioned properly, program execution will not reach 740-7, since power should have been cut off from the spa system. If the spa is still running at 740-7, a "GFCI failed" condition is set at 740-8, and a warning message, e.g. "GFI," is displayed on the spa control panel display. The function then enters a "loop forever" mode; the loop is only for this function; however, the "GFCI failed" condition declared results in locking out most other activity on the spa. Some basic internal functions such as timekeeping will continue.

One exemplary algorithm for calculating a variable, virtually "random" time interval, is the following. 1. Start with the "tenths" value of the "absolute" time; the system has been counting time since power-up to a resolution of tenths of a second. 2. Multiply that value by 10. 3. Take the "seconds" of the "absolute" time and logically-AND that value with 8, then add the result to the result from step 2. 4. Add 1 to be sure the final value is non-zero. 5. The result at this point is the "random" number of tenths of a second.

Figure 9F:
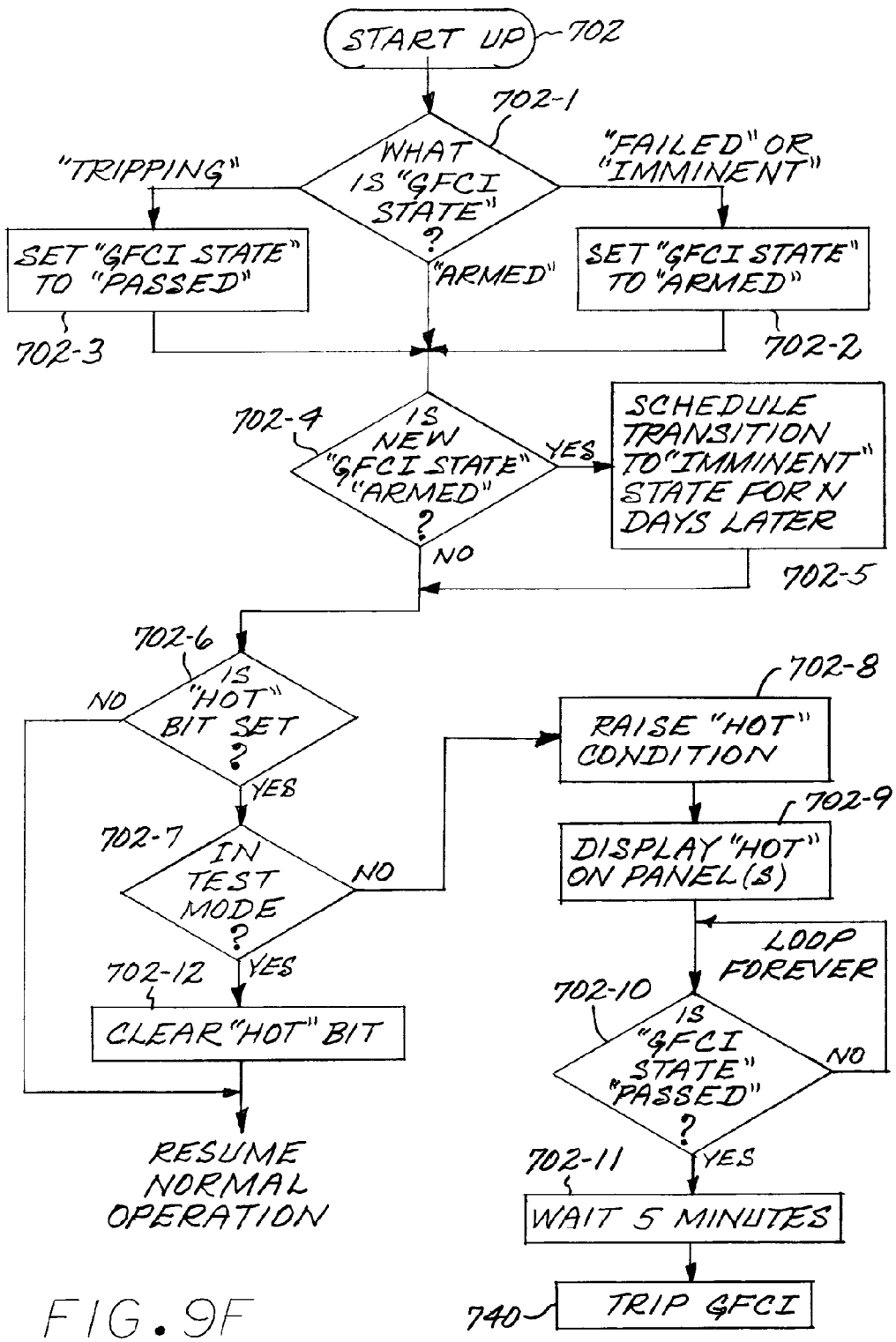

FIG. 9F illustrates an exemplary embodiment of the start-up process 702 entered upon power-up of the spa system and controller. At 702-1, the controller determines the GFCI state, which in an exemplary embodiment is data stored in non-volatile memory of the controller. If the state is "armed" operation proceeds immediately to 702-4. If the state is "failed" or "imminent" the GFCI state is set to "armed," and operation proceeds to 702-4. If the state is "tripping" the GFCI state is set to "passed" and operation proceeds to 702-4. If the new state is the "armed" state, a transition of state is scheduled to occur N days later, before operation proceeds to 702-6. In an exemplary embodiment, N can be one to seven days, as set during system build or initial programming as described above. At 702-6, the state of the "hot" bit is determined. If not set, normal operation is resumed. If the hot bit is set, and if the system is not in the test mode at 702-12, the "hot" condition is raised at 702-8, the control panel display shows a warning message, e.g. "hot," at 702-9. If the GFCI state is not the "passed" state, the function enters a loop forever mode. If the GFCI state is the passed state, then the function waits for a predetermined period of time, e.g. five minutes, and then trips the GFCI trip circuit at 740.

Figure 9G:
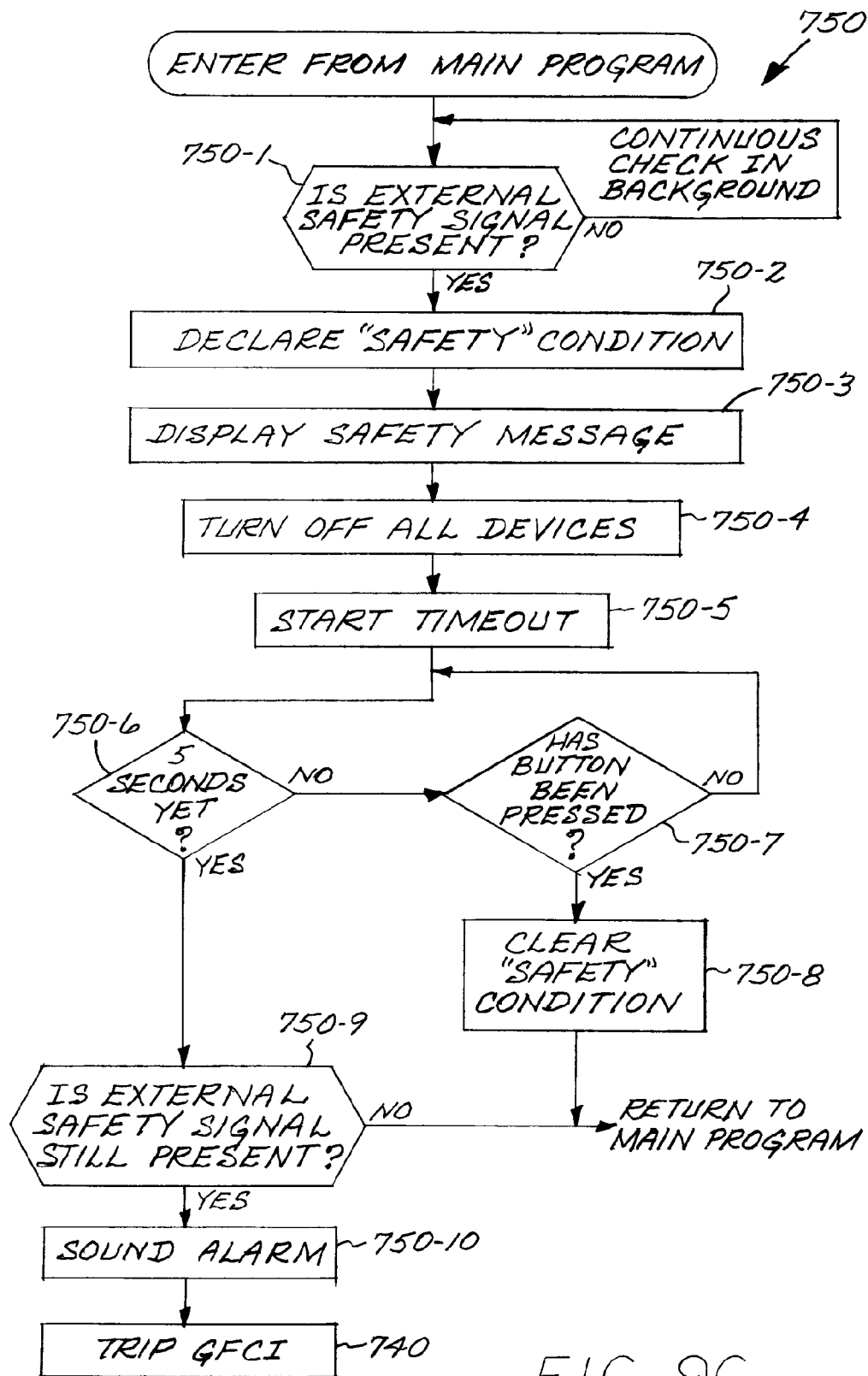

FIG. 9G illustrates an exemplary technique 750 for addressing a detected safety condition, which is entered from the main program (FIG. 9B). The detection may be performed, e.g., by a signal from a vacuum sensor as described above, indicating a blockage in a water flow path. At 752-1, the program checks to determine whether an external safety signal is present. If so, a "safety" condition is declared at 750-2, a safety message is displayed on the control panel(s) at 750-3, and commands are given by the electronic control system to turn off all devices at 750-4. A timeout timer is started at 750-5, in this example a 5 second timer, during which the control panel buttons are monitored at 750-7 for a button push, reflecting that the user is aware of the safety condition, and the safety condition cleared at 750-8 as a result, and operation returns to the main program. If no buttons are pushed and once the timeout occurs at 750-6, the controller checks to determine whether the external safety signal is still present at 750-9. If not, the program returns to the main program. If the external safety signal is still present, an alarm is activated (750-10), typically an audible alarm, and the program proceeds to the "trip GFCI" routine 740. In another exemplary embodiment, the controller may attempt a different response to the safety condition, e.g. turning off a water pump and actuating a valve to release air into the water flow path, in an attempt to relieve a vacuum condition indicating a block in the flow path, in order to relieve the safety condition. The controller may wait some period of time after taking this response, before determining whether the safety condition has been relieved by this response. The wait time may be relatively short, e.g. a matter of seconds, in one exemplary embodiment. If the safety condition is still present after taking the first response action, then the GFCI may be tripped.

Figure 10:
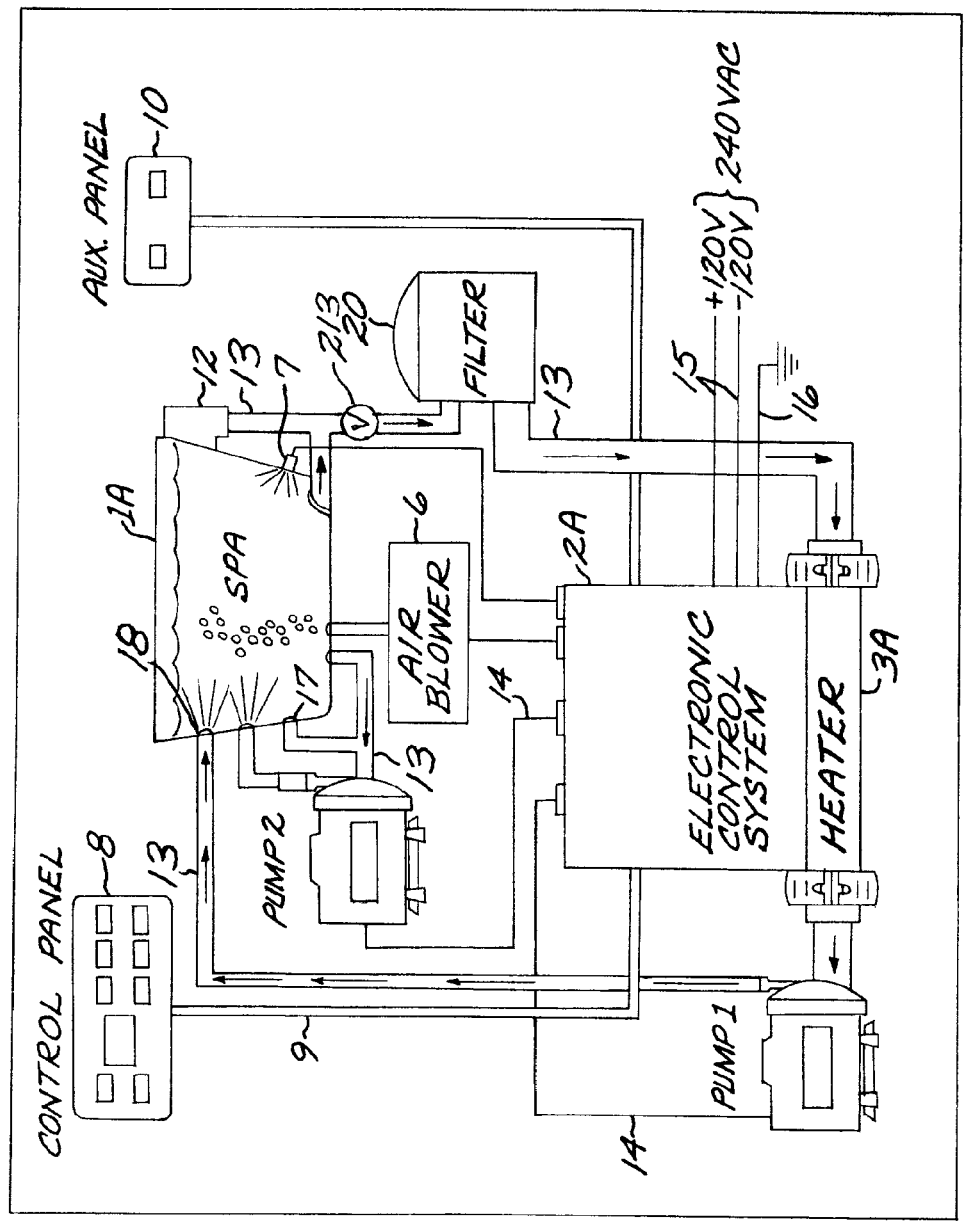
FIG. 10 illustrates an overall block diagram of a spa system with typical equipment and plumbing installed.

The GFCI trip circuit and control algorithms may be used in other installations, e.g. a spa installation such as a permanently installed spa, or a portable spa installation, i.e. a spa installation which is not permanently affixed in a permanent fixture, or a bath. FIG. 10 illustrates an overall block diagram of a spa system with typical equipment and plumbing installed. The system includes a spa 1A for bathers with water, and a control system 2A to activate and manage the various parameters of the spa. Connected to the spa 1A through a series of plumbing lines 13 are pump 1 and pump 2 for pumping water, a skimmer 12 for cleaning the surface of the spa, a filter 20 for removing particulate impurities in the water, an air blower 6 for delivering therapy bubbles to the spa through an air pipe, and an electric heater 3A for maintaining the temperature of the spa at a temperature set by the user. The heater 3A in this embodiment is an electric heater, but other types of heaters, e.g. a coal, oil or gas heater, can be used for this purpose also. A light 7 may be provided for internal illumination of the water.

Service voltage power is supplied to the spa control system at electrical service wiring 15, which can be 120V or 240V single phase 60 cycle, 220V single phase 50 cycle, or any other generally accepted power service suitable for commercial or residential service. An earth ground 16 is connected to the control system and there through to all electrical components which carry service voltage power and all metal parts. Electrically connected to the control system through cables are the control panels 8 and 10. All components powered by the control system are connected by cables 14 suitable for carrying appropriate levels of voltage and current to properly operate the spa.

Water is drawn to the plumbing system generally through the skimmer 12 or suction fittings 17, and discharged back into the spa through therapy jets 18.

Figure 11:
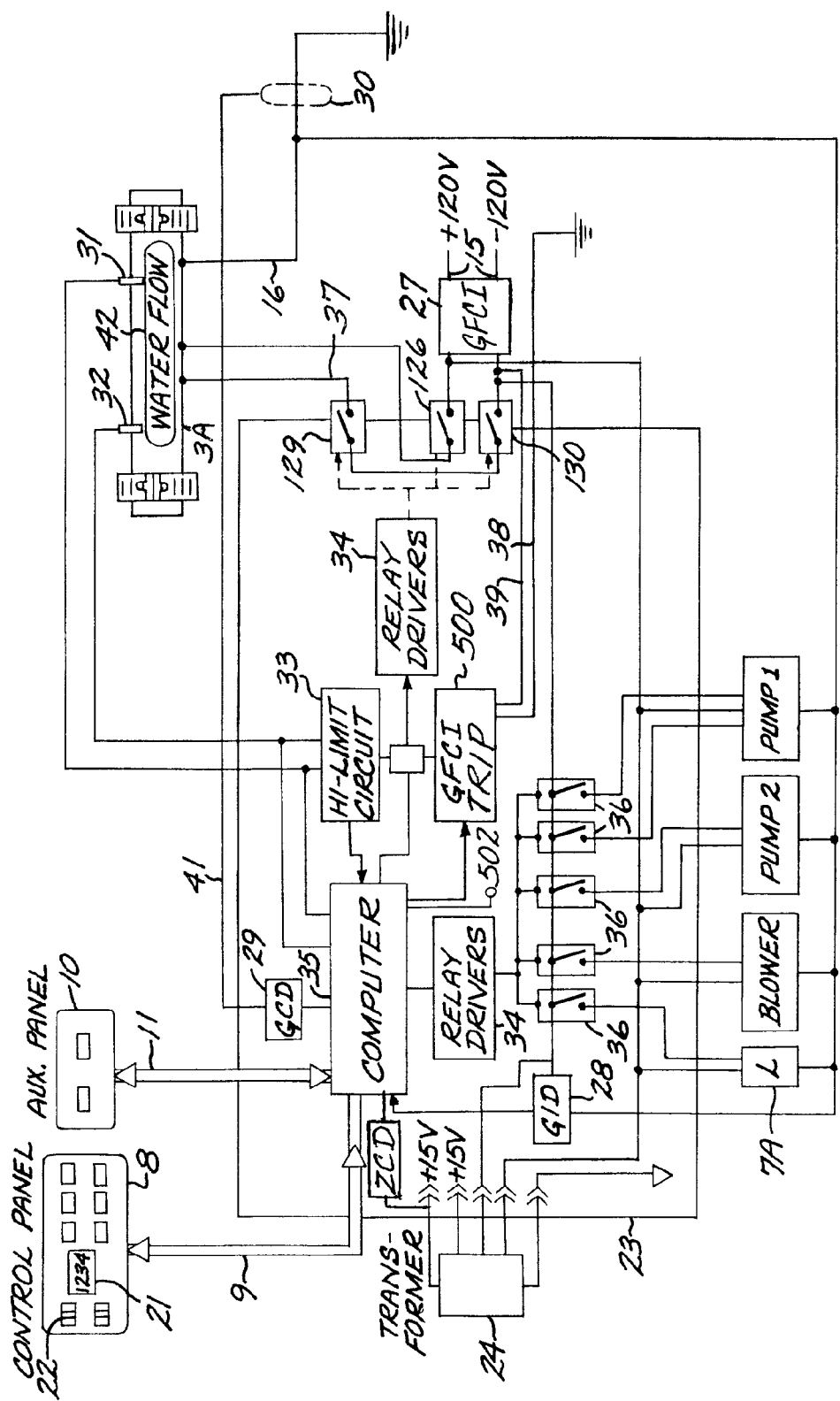
FIG. 11 is a simplified schematic diagram of an exemplary embodiment of the electronic control system for the spa system of FIG. 10.

An exemplary embodiment of the electronic control system is illustrated in schematic form in FIG. 11. The control system circuit assembly board is housed in a protective enclosure. The heater assembly 3A may be attached to the enclosure, and includes inlet/outlet ports with couplings for connection to the spa water pipe system.

An exemplary embodiment of the electronic control system 2A includes a variety of electrical components generally disposed on a circuit board and connected to the service voltage power connection 15. Earth ground 16 is brought within the enclosure of the electronic control system and is attached to a common collection point.

In an exemplary embodiment, adjacent to the circuit board, a power and isolation transformer 24 is provided. This transformer converts the service line power from high voltage with respect to earth ground to low voltage, fully isolated from the service line power. A zero crossing detector (ZCD) is connected at an output of the transformer to detect zero crossings in the AC power waveform, as described above. Also provided on the circuit board, in this exemplary embodiment, is a control system computer 35, e.g. a microcomputer such as a Pic 16C65A CMOS microcomputer marketed by Microchip, which accepts information from a variety of sensors and acts on the information, thereby operating according to instructions described more fully in FIG. 9A-9G. The embodiments are not limited to the use of a controller including a microcomputer or microprocessor, whose functions can instead be performed by other circuitry, including, by way of example only, an ASIC, or by discrete logic circuitry.

One or more outputs of the computer 35 is displayed on the control panel 8 through a character display system rendered optically visible by technology generally known in the art. Tactile sensors 22 are provided to convert user instructions to computer readable format which is returned to the control system computer 35.

Referring to FIGS. 10-11, the equipment used to heat and manage the water quality, i.e. the heater system 3A, pump 1 and pump 2, blower 6 and light 7, are connected via electrical cables 14 to relays 36, 126, 129 and 130 on the circuit board 23, which function under the control of relay drivers 34, selectively driven by the microcomputer 35. These relays and relay drivers function as electrically controlled switches to operate the powered devices, and may be accomplished by methods well known in the art and provide electrical isolation from the service voltage power for the low voltage control circuitry. Of course, other types of switching devices can alternatively be employed, such as SCRs and triacs.

The control system 2A in this exemplary embodiment includes several safety circuits, which protect the system in case of error or failure of the components. Shown in the functional schematic diagram of FIG. 11 is the heater system 3A, which includes in an exemplary embodiment a generally tubular housing constructed of a corrosion resistant material such as 316 stainless steel, a heater element 42 for heating the water, a heater power connection 37 from heater relays to the terminals of the heater element, and temperature sensors 31 and 32 connected through lines to appropriate circuitry on the circuit board. These sensors are connected on the circuit board to both a hardware high limit circuit 33 and to the computer control circuit 35. Other types of heaters may alternatively be employed, e.g. heaters with plastic housings, or heaters shown in US Published patent application nos. 20020050490 and 20020000007.

A torroid 30, constructed in accordance with techniques well known in the art, is provided through which the earth ground connection 16 from the heater housing and any other ground connection in the system passes. This torroid is electrically connected by cable 41 to a ground current detector circuitry 29. The output of the ground current detector (GCD) is provided to the computer system 35 via an electrical connection through the signal conditioning circuitry.

The service voltage power is provided to the system through a GFCI 27 by electrical connections shown as 38 and 39. A GFCI trip circuit 500 is controlled by the computer 35 in this embodiment, and provides a means for inducing a ground fault to trip the GFCI 27.

Although the foregoing has been a description and illustration of specific embodiments of the invention, various modifications and changes thereto can be made by persons skilled in the art without departing from the scope and spirit of the invention as defined by the following claims.

What is claimed is:

1. A method for controlling a bathing installation, comprising:
sensing a water temperature of water in a bathing installation tub or a recirculating water flow path for the bathing installation;
starting a timer when said sensed water temperature equals a first predetermined temperature threshold;
stopping and resetting the timer if said water temperature falls to a second predetermined temperature threshold which is less than said first threshold;
entering a fault mode if:
said sensed water temperature has risen by a first temperature increment within a first preceding time interval since the timer was started, and is now equal to or greater than a third predetermined threshold which is greater than said first threshold.

2. A method for controlling a spa, comprising:
sensing a water temperature of water in a spa tub or a recirculating spa water flow path;
starting a timer when said sensed water temperature equals a first predetermined temperature threshold;
stopping and resetting the timer if said water temperature falls to a second predetermined temperature threshold which is less than said first threshold;
entering a fault mode if said sensed water temperature has risen by a second temperature increment since said timer was last started, and is now equal to or greater than a fourth predetermined threshold which is greater than said third threshold.

3. A method for controlling a spa, comprising:
sensing a water temperature of water in a spa tub or a recirculating spa water flow path;
starting a timer when said sensed water temperature equals a first predetermined temperature threshold;
stopping and resetting the timer if said water temperature falls to a second predetermined temperature threshold which is less than said first threshold;
entering a fault mode if said sensed water temperature has risen by a third temperature increment since said timer was last started, and is now greater than or equal to said fourth predetermined threshold, and said timer has been running for at least a second preceding time interval.

4. The method of claim 3, wherein said fault mode includes setting a fault flag in a nonvolatile memory.

5. The method of claim 3, further comprising performing a disable function after setting said default flag to disable power from said spa.

6. The method of claim 5, wherein said performing a disable function comprises:
inducing a ground fault to trip a ground fault circuit interrupter circuit.

7. A method for controlling a spa, comprising:
sensing a water temperature of water in a spa tub or a recirculating spa water flow path;
starting a timer when said sensed water temperature equals a first predetermined temperature threshold;
stopping and resetting the timer if said water temperature falls to a second predetermined temperature threshold which is less than said first threshold;
entering a fault mode if:
(i) said sensed water temperature has risen by a first temperature increment within a first preceding time interval since the timer was started, and is now equal to or greater than a third predetermined threshold which is greater than said first threshold;

(ii) said sensed water temperature has risen by a second temperature increment since said timer was last started, and is now equal to or greater than a fourth predetermined threshold which is greater than said third threshold; or (iii) said sensed water temperature has risen by a third temperature increment since said timer was last started, and is now greater than or equal to said fourth predetermined threshold, and said timer has been running for at least a second preceding time interval.

8. The method of claim 7, wherein said fault mode includes setting a fault flag in a nonvolatile memory.

9. The method of claim 8, further comprising performing a disable function after setting said default flag to disable power from said spa.

10. The method of claim 9, wherein said performing a disable function comprises:

simulating a ground fault to trip a ground fault circuit interrupter circuit.

11. A method for monitoring and controlling operation of a spa installation including a spa vessel for holding water, a line voltage electrical supply, an electronic controller, a ground fault interrupt circuit (GFCI), a water heater system and a pump for recirculating water through a recirculating water flow path, comprising:

sensing a stoppage or restricted flow in the water flow path;

inducing a ground fault to trip the GFCI to interrupt power to the pump.

12. The method of claim 11, wherein said sensing a stoppage or restricted flow in the water flow path comprises:

monitoring an electrical output signal from a pressure sensor mounted to sense a water pressure in the water flow path.

13. The method of claim 1, wherein said sensing a water temperature comprises sensing a water temperature in a recirculating water flow path, and comprises:

activating a water pump to circulate water from the tub through the water flow path past a temperature sensor so that the temperature sensor is sensing water temperature indicative of water temperature in the tub.

14. The method of claim 13, wherein said activating a water pump is performed during a filter cycle conducted periodically, to pass water through a filter connected in the recirculating water flow path without activating a water heater.

15. The method of claim 14, further comprising:

activating a filter cycle on a predetermined periodic schedule even in the event the bathing installation is in a sleep or an economy mode.

16. The method of claim 13, wherein the temperature sensor is located in the water recirculation path adjacent an input to a water heater in the path.

17. The method of claim 1, wherein said fault mode comprises performing a disable function to disable power from said spa.

18. The method of claim 2, wherein said entering said fault mode includes declaring a stuck relay condition.

19. The method of claim 18, wherein said fault mode further comprises starting a disable algorithm in a bathing installation electronic controller to trip a ground fault circuit interrupter to disable power to the bathing installation.

20. The method of claim 3, wherein said sensing a water temperature comprises sensing a water temperature in the recirculating water flow path, and comprises:

activating a water pump to circulate water from the tub through the water flow path past a temperature sensor so that the temperature sensor is sensing water temperature indicative of water temperature in the tub.

* * * * *